US008983652B2

(12) United States Patent
Nozaki

(10) Patent No.: US 8,983,652 B2
(45) Date of Patent: Mar. 17, 2015

(54) TRANSPORTING APPARATUS

(71) Applicant: Mitsuhiro Nozaki, Nagoya (JP)

(72) Inventor: Mitsuhiro Nozaki, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 170 days.

(21) Appl. No.: 13/851,453

(22) Filed: Mar. 27, 2013

(65) Prior Publication Data

US 2013/0282167 A1    Oct. 24, 2013

(30) Foreign Application Priority Data

Apr. 24, 2012    (JP) .................. 2012-099093

(51) Int. Cl.
| | |
|---|---|
| G06F 7/00 | (2006.01) |
| B65G 43/00 | (2006.01) |
| B41J 11/42 | (2006.01) |
| B65H 3/06 | (2006.01) |
| B65H 3/68 | (2006.01) |
| B65H 5/06 | (2006.01) |
| B65H 7/02 | (2006.01) |

(52) U.S. Cl.
CPC .............. *B65G 43/00* (2013.01); *B41J 11/42* (2013.01); *B65H 3/0684* (2013.01); *B65H 3/68* (2013.01); *B65H 5/062* (2013.01); *B65H 7/02* (2013.01); *B65H 2402/46* (2013.01); *B65H 2405/3322* (2013.01); *B65H 2513/108* (2013.01); *B65H 2513/20* (2013.01); *B65H 2515/704* (2013.01); *B65H 2553/51* (2013.01)

USPC ........... 700/230; 700/213; 700/228; 700/229

(58) Field of Classification Search
None
See application file for complete search history.

(56) References Cited

U.S. PATENT DOCUMENTS

2009/0283961 A1* 11/2009 Saito et al. .................... 271/220
2009/0302530 A1* 12/2009 Darsosumarto et al. . 271/265.01

FOREIGN PATENT DOCUMENTS

| JP | 2008-217405 A | 9/2008 |
|---|---|---|
| JP | 2009-234015 A | 10/2009 |
| JP | 2009-292094 A | 12/2009 |

* cited by examiner

*Primary Examiner* — Yolanda Cumbess
(74) *Attorney, Agent, or Firm* — Merchant & Gould PC

(57) ABSTRACT

A transporting apparatus includes a motor, a transporting mechanism which receives a power from the motor and transports the sheet, and a control section which controls the motor in accordance with a predetermined control sequence to make the transporting mechanism transport the sheet up to a target position, and detects an occurrence of an electric-current saturation phenomenon in the motor. When the control section detects the occurrence of the electric-current saturation phenomenon, the control section performs correction of the predetermined control sequence including correction in which a target transporting velocity of the sheet is lowered from a predetermined value determined in the predetermined control sequence, and controls the motor in accordance with the corrected control sequence to make the transporting mechanism transport the sheet so that the sheet is stopped at the target position.

9 Claims, 30 Drawing Sheets

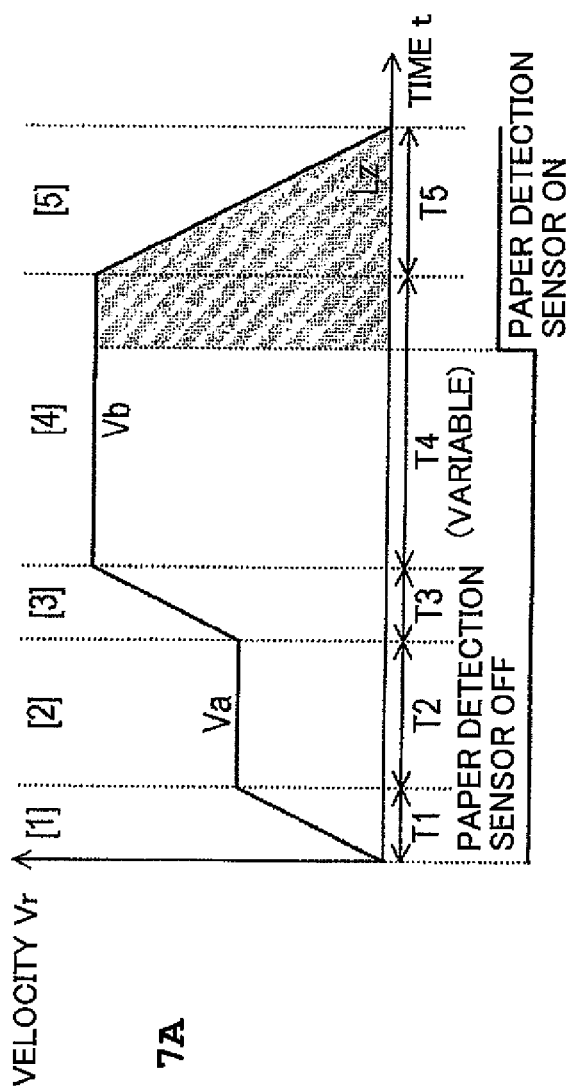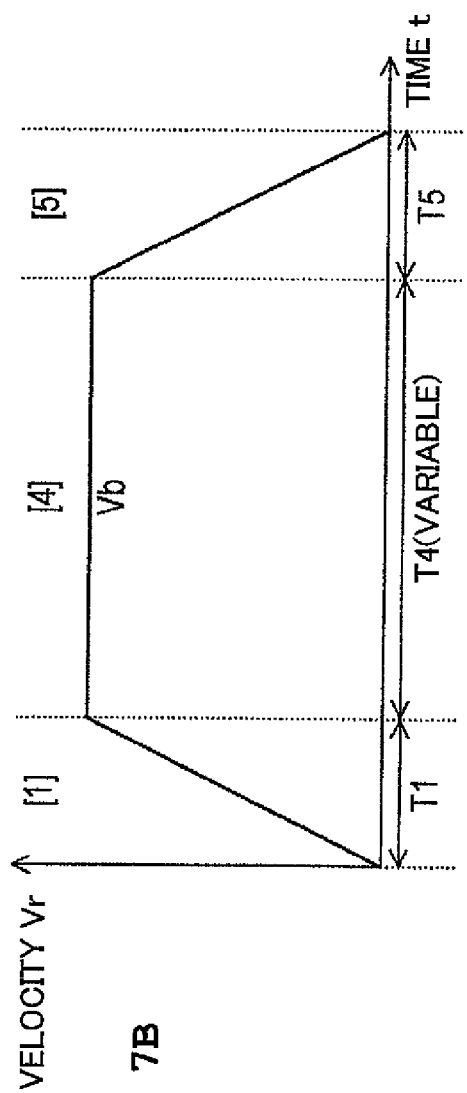
Fig. 7A
Fig. 7B

TRANSPORTING APPARATUS

CROSS REFERENCE TO RELATED APPLICATION

The present invention claims priority from Japanese Patent Application No. 2012-099093, filed on Apr. 24, 2012, the disclosure of which is incorporated herein by reference in its entirety.

BACKGROUND OF THE INVENTION

1. Field of the Invention

The present invention relates to a transporting apparatus which transports a sheet.

2. Description of the Related Art

An image forming apparatus such as an ink-jet printer and a reading apparatus have hitherto been known as apparatuses which transport a sheet. The ink-jet printer forms an image on a paper by jetting an ink on to a recording paper from a recording head while transporting the paper in a secondary scanning direction. The reading apparatus generates image data corresponding to an image of a document which is read by a reading head by reading an area of the document facing the reading head while transporting the document. Moreover, an apparatus which transports a paper by rotating rollers by a motor has been known.

Moreover, an image forming apparatus in which a motor is controlled such that a material to be transported is transported according to a predetermined velocity table has hitherto been known (refer to Japanese Patent Application Laid-open No. 2009-234015 for example). In the abovementioned image forming apparatus, in a case in which the material to be transported does not follow a first velocity table for example, an increase in a transporting load is dealt with by transporting the material to be transported according to a second velocity table with a lower velocity.

SUMMARY OF THE INVENTION

Incidentally, in the conventional image forming apparatus, in a case in which it is not possible to transport an object material according to a first velocity table due to the increase in load, the material to be transported is transported according to a second velocity table having a lower velocity. Therefore, it is not possible to recover an error in a transporting amount which is caused while switching over a velocity table to be used from the first velocity table to the second velocity table, and it is not possible to stop the material to be transported (sheet) at a target position with high accuracy.

The present invention has been made in view of the above-mentioned problem, and an object of the present invention is to provide a technology which enables to transport a sheet up to a target position and stop the sheet with high accuracy, even in a case in which a load on the motor has increased.

A transporting apparatus according to the present invention includes a motor, a transporting mechanism which receives a power from the motor and which transports the sheet, and a control section. The control section detects an occurrence of an electric-current saturation phenomenon in the motor, and makes the transporting mechanism transport the sheet by controlling the motor.

The control section makes the transporting mechanism transport the sheet up to a target position by controlling the motor according to a control sequence which has been determined in advance. However, as the control section detects the occurrence of the electric-current saturation phenomenon, the control section carries out correction in which a target transporting velocity of the sheet is lowered from a predetermined value determined in the control sequence. Moreover, the control section makes the transporting mechanism transport the sheet such that the sheet is stopped at the target position by controlling the motor according to the corrected control sequence.

In other words, according to the transporting apparatus according to the present invention, when the electric-current saturation phenomenon has occurred in the motor, the control section controls the motor such that the occurrence of the electric-current saturation phenomenon is suppressed and the sheet is transported at the target transporting velocity by the correction in which the target transporting velocity of the sheet is lowered from the predetermined value determined in the control sequence. Moreover, since it is difficult to stop the sheet accurately at the target position only by correcting the target transporting velocity, the control section corrects a subsequent control sequence till the sheet reaches the target position.

According to the present invention, it is possible to suppress an effect due to an increase in a load than in a conventional method of correcting only the target transporting velocity, and to stop the sheet at the target position with high accuracy.

BRIEF DESCRIPTION OF THE DRAWINGS

FIG. 7A is a graph showing a trajectory of a velocity command value which is outputted from a command generating section of the paper-feed control section at a normal time, and FIG. 7B is a graph showing a trajectory of the velocity command value which is outputted from a command generating section of the paper-transport control section at the normal time.

DETAILED DESCRIPTION OF THE PREFERRED EMBODIMENTS

Exemplary embodiments of the present invention will be described below while referring to the accompanying diagrams.

First Embodiment

Figure 1:
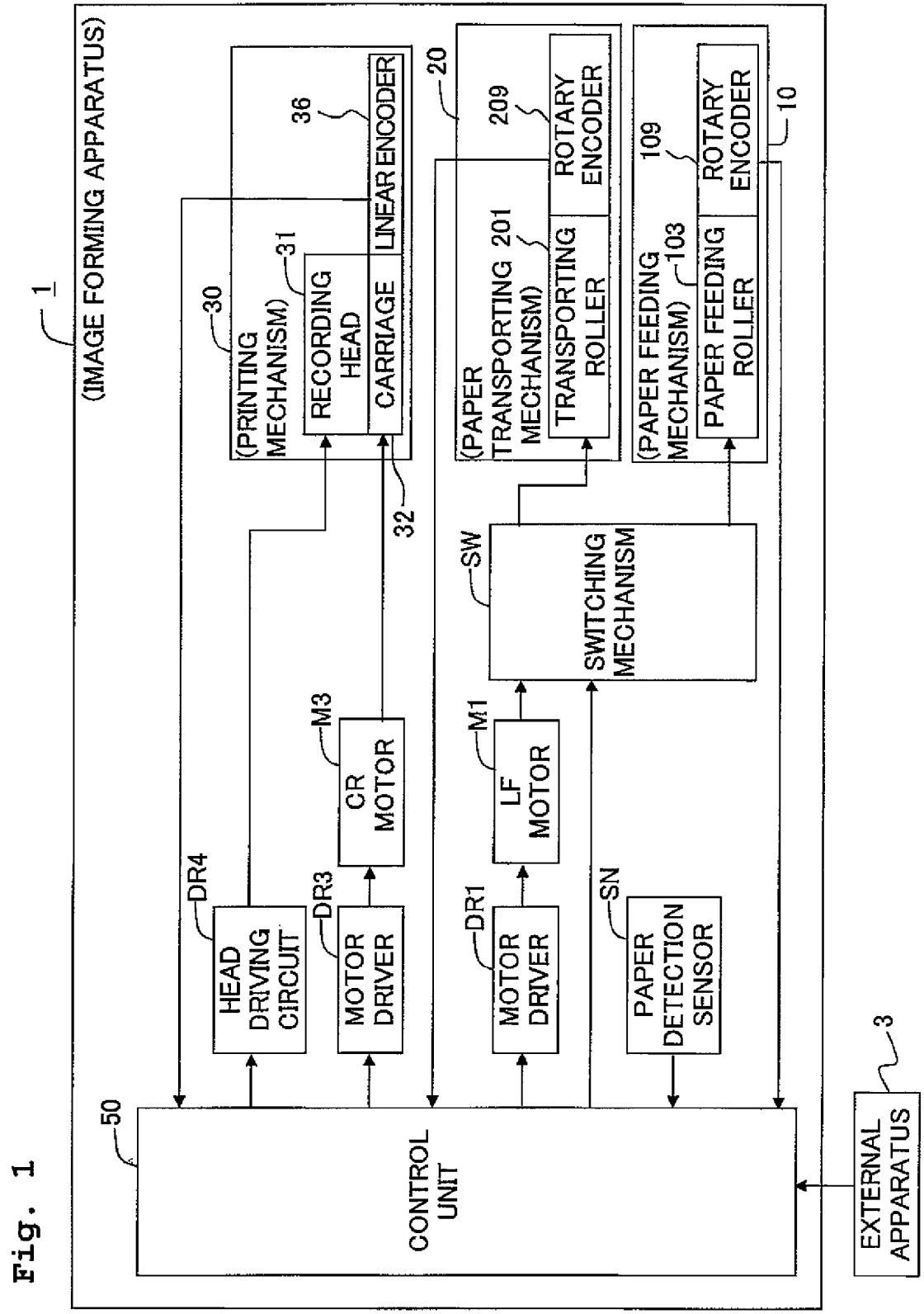
FIG. 1 is a block diagram showing a configuration of an image forming apparatus.

An image forming apparatus 1 according to a first embodiment is a so-called ink-jet printer. As shown in FIG. 1, the image forming apparatus 1 includes a paper feeding mechanism 10, a paper transporting mechanism 20, a printing mechanism 30, a control unit 50, a switching mechanism SW, an LF motor M1, a motor driver DR1, a CR motor M3, a motor driver DR3, a head driving circuit DR4, and a paper detection sensor SN.

The LF motor M1 is a direct current motor which applies a motive force to the paper feeding mechanism 10 and the paper transporting mechanism 20 via the switching mechanism SW, and is driven by the motor driver DR1. The switching mechanism SW is controlled by the control unit 50, and connects the LF motor M1 to one of the paper feeding mechanism 10 and the paper transporting mechanism 20.

The CR motor M3 is a direct current motor which applies a motive force to the printing mechanism 30, and is driven by the motor driver DR3. The head driving circuit DR4 drives a recording head 31.

Figure 2:
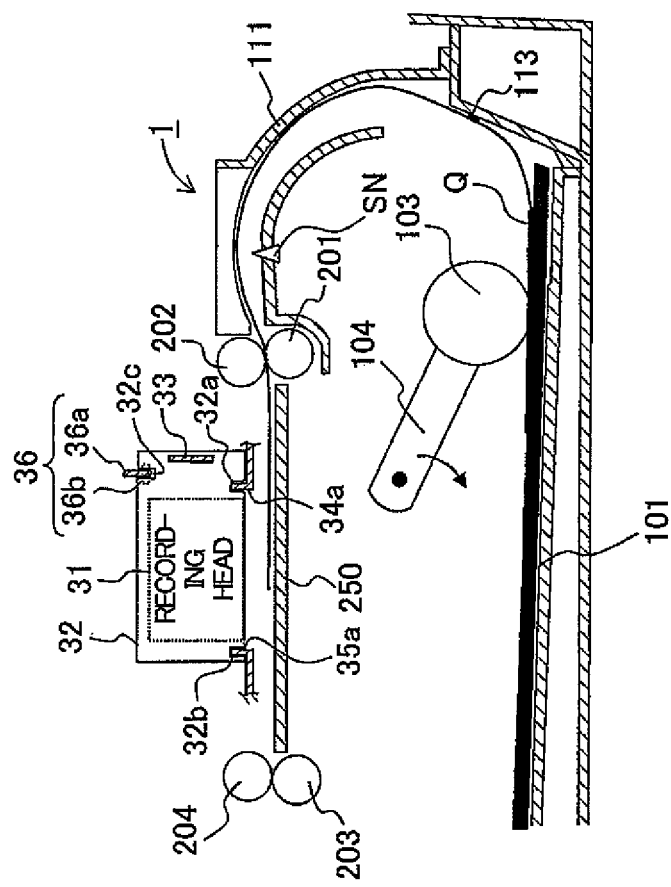
FIG. 2 is a diagram showing a structure of a paper feeding mechanism and a paper transporting mechanism.

The paper feeding mechanism 10 receives the motive force from the LF motor M1, and picks up one paper Q at a time from the papers Q which are accommodated in a paper feeding tray 101, and feeds to the paper transporting mechanism 20. The paper feeding mechanism 10, as shown in FIG. 2, includes the paper feeding tray 101, a paper feeding roller 103, an arm 104, and a rotary encoder 109 (refer to FIG. 1). The plurality of papers Q is stacked in the paper feeding tray 101. The arm 104 presses the paper feeding roller 103 against a surface of the paper Q stacked in the paper feeding tray 101 by using a bias by a gravitational force or by a spring. The arm 104 holds the paper feeding roller 103 in a state of being able to rotate, and the paper feeding roller 103 rotates upon receiving the motive force from the LF motor M1.

The rotary encoder 109 is a known incremental-type rotary encoder which outputs an encoder signal as the paper feeding roller 103 rotates. The rotary encoder 109 is fitted to a rotating shaft of the paper feeding roller 103, and outputs a pulse signal corresponding to the rotation of the paper feeding roller 103, as the encoder signal.

In the paper feeding mechanism 10, the paper feeding roller 103 rotates upon receiving the motive force of the LF motor M1 in a state of being pressed against the paper Q. By the rotation of the paper feeding roller 103, a force in a secondary scanning direction which is a transporting direction of the paper Q acts on the paper Q, and the paper Q is sent to a paper transporting path at a downstream side in the transporting direction of the paper feeding tray 101 which is connected to the paper transporting mechanism 20. The paper Q which is sent from the paper feeding tray 101 is guided by a U-turn path 111 having a U-shape which forms the paper transporting path, and is transported to be pinched between a transporting roller 201 and a pinch roller 202 of the paper transporting mechanism 20, in a state of being curved.

The paper detection sensor SN is provided at a point which is at a predetermined distance upstream of the paper transporting mechanism 20, in a paper transporting path from the paper feeding mechanism 10 up to the paper transporting mechanism 20, and detects the paper Q which passes this point. The paper detection sensor SN outputs an ON signal as a sensor signal in a case in which the paper Q passes this point, and the paper detection sensor SN outputs an OFF signal as the sensor signal in a case other than the case in which the paper Q passes this point.

The paper transporting mechanism 20, as shown in FIG. 2, includes the transporting roller 201, the pinch roller 202, a paper discharge roller 203, a spur roller 204, and a rotary encoder 209 (refer to FIG. 1). The pinch roller 202 is arranged to be facing the transporting roller 201, and the spur roller 204 is arranged to be facing the paper discharge roller 203. Moreover, the paper discharge roller 203 is provided at a downstream side in the secondary scanning direction of the transporting roller 201.

The transporting roller 201 rotates upon receiving a motive force from the LF motor M1 via the switching mechanism SW. The paper discharge roller 203 is coupled with the transporting roller 201 by a belt, and rotates in conjunction with the transporting roller 201. In other words, the transporting roller 201 and the paper discharge roller 203 rotate by the same amount in a peripheral direction by rotating in synchronization.

The rotary encoder 209 is a known incremental-type rotary encoder which outputs an encoder signal as the transporting roller 201 rotates. The rotary encoder 209 is fitted to a rotating shaft of the transporting roller 201, and outputs a pulse signal corresponding to the rotation of the transporting roller 201, as the encoder signal.

In the paper transporting mechanism 20, by the transporting roller 201 and the paper discharger roller 203 rotating in synchronization upon receiving the motive force from the LF motor M1, a force in the secondary scanning direction acts on the paper Q which has been fed from the paper feeding mechanism 10 through the transporting roller 201 and the paper discharge roller 203, and the paper Q is transported up to a paper discharge tray which is not shown in the diagram but is provided at a downstream side of the paper discharge roller 203. At this time, the pinch roller 202 rotates following the transporting roller 201, in a state of the paper Q pinched between the transporting roller 201 and the pinch roller 202, and the spur roller 204 rotates following the paper discharge roller 203 in a state of the paper Q pinched between the paper discharge roller 203 and the spur roller 204. The paper Q, in a state of being pinched between the transporting roller 201 and the pinch roller 202, and furthermore, in a state of being pinched between the paper discharge roller 203 and the spur roller 204, is transported to a downstream side of the secondary scanning direction by the rotation of the transporting roller 201 and the paper discharge roller 203.

Moreover, a platen 250 is provided between the transporting roller 201 and the paper discharge roller 203, in the secondary scanning direction. The platen 250 supports the paper Q transported from the transporting roller 201, and guides to the paper discharge roller 203. On the platen 250, an image is formed by ink droplets jetted from the recording head 31 which forms the printing mechanism 30, on to the paper Q which is transported from the transporting roller 201 to the paper discharge roller 203.

The printing mechanism 30, as shown in FIG. 1 and FIG. 2, includes the recording head 31, a carriage 32 on which, the recording head 31 is mounted, and a linear encoder 36. The recording head 31 jets ink droplets corresponding to a drive signal which is input from the head driving circuit DR4, from a nozzle surface facing the platen 250.

Figure 3:
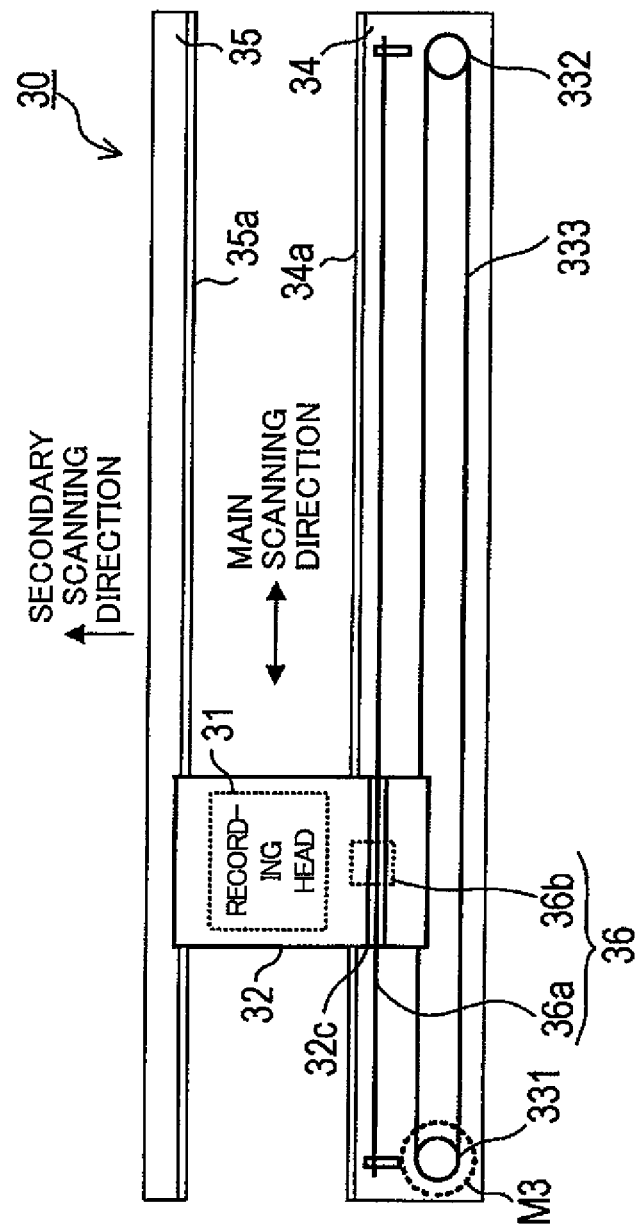
FIG. 3 is a plan view showing a structure of a printing mechanism.

Moreover, the printing mechanism 30 includes a carriage transporting mechanism which transports the carriage 32 in a main scanning direction (normal direction of a paper surface in FIG. 2) upon receiving the motive force from the CR motor M3. The carriage transporting mechanism, as shown in FIG. 3, includes a drive pulley 331 which is driven by the CR motor M3, a driven pulley 332, a belt 333 which is put around the drive pulley 331 and the driven pulley 332, a frame 34 having a guide rail 34a which is extended in the main scanning direction which is orthogonal to the secondary scanning direction, and a frame 35 having a guide rail 35a which is extended in the main scanning direction.

The carriage 32 is supported by the guide rails 34a and 35a which form the carriage transporting mechanism. As shown in FIG. 2, groove portions 32a and 32b which are extended in the main scanning direction are formed in a lower surface of the carriage 32, and the guide rails 34a and 35b are inserted through the groove portions 32a and 32b respectively.

Moreover, the carriage 32 is fixed to the belt 33 which is provided in parallel to the guide rails 34a and 35a, and moves in the main scanning direction upon receiving indirectly the motive force from the CR motor M3 via the belt 333. The drive pulley 331 (refer to FIG. 3) rotates by a motive force from the CR motor M3, which is transmitted via a gear. Due to the rotation of the drive pulley 331, the belt 333 which has been put around the drive pulley 331 and the driven pulley 332, rotates. Whereas, a direction of movement of the carriage 32 is restricted to the main scanning direction, by the guide rails 34a and 35a. Consequently, as the CR motor M3 rotates, the carriage 32 moves in the main scanning direction in conjunction with the rotation of the belt 333.

The linear encoder 36 includes an encoder scale 36a and a sensor portion 36b. The encoder scale 36a, as shown in FIG. 3, is extended along the main scanning direction, and is inserted into a groove portion 32c (refer to FIG. 2) which is formed along the main scanning direction on an upper surface of the carriage 32. The sensor portion 36b is provided to the groove portion 32c of the carriage 32. In the linear encoder 36, as the carriage 32 moves, the sensor portion 36b reads the encoder scale 36a. Accordingly, the linear encoder 36 outputs a pulse signal corresponding to the movement of the carriage 32 in the main scanning direction, to the control unit 50 (refer to FIG. 1), as an encoder signal.

Next, the control unit 50 will be described below. The control unit 50 according to the first embodiment carries out an integrated control of various sections of the image forming apparatus 1, and forms an image on the paper Q based on image data to be printed which has been input together with a print command from an external apparatus 3. As the print command is input from the external apparatus 3, the control unit 50 executes a printing process on the paper Q including a paper feeding process, a process of locating front end of paper, and a sending process.

In the paper feeding process, the control unit 50 controls the switching mechanism SW and connects the LF motor M1 to the paper feeding mechanism 10. Thereafter, based on the encoder signal which has been outputted from the rotary encoder 109, the control unit 50 controls the LF motor M1 according to a control sequence which has been determined in advance. By controlling the LF motor M1, the control unit 50 makes the paper feeding roller 103 rotate, and upon picking up one of the papers Q placed on the paper feeding tray 101, feeds to the paper transporting mechanism 20. The control sequence is a control procedure during a time period from a start of the drive of the LF motor M1 till the drive is stopped, and in the first embodiment, the control unit 50 executes the control of the LF motor M1 in phases according to the control sequence. The control sequence of the first embodiment is regulated mainly by a control time and a pattern of a velocity command value in each phase.

As the process of paper feeding is over, the control unit 50 carries out the process of locating front end of paper. In the process of locating front end of paper, the control unit 50, after connecting the LF motor M1 to the paper transporting mechanism 20 by controlling the switching mechanism SW, controls the LF motor M1 based on the encoder signal which is outputted from the rotary encoder 209, according to the control sequence which has been determined in advance. By such control, the control unit 50 makes the transporting roller 201 rotate, and transports the paper Q till an image-formation starting line of the paper Q reaches an image-formation point by the recording head 31.

As the process of locating the front end of paper is terminated, the control unit 50 executes a line image formation process. In the line-image formation process, the control unit 50 controls the CR motor M3 based on an encoder signal which is outputted from the linear encoder 36. By such control, the control unit 50 transports the carriage 32 up to a turn-around point in the main scanning direction. Furthermore, at the time of transporting the carriage 32, the control unit 50 controls the recording head 31 via the head driving circuit DR4, and makes the recording head 31 jet ink droplets. Accordingly, a line image based on image data to be subjected to printing is formed on the paper Q.

As the line-image formation process is terminated, the control unit 50 executes the sending process. In the sending process, the control unit 50, after having connected the LF motor M1 to the paper transporting mechanism 20, controls the LF motor M1 based on the encoder signal which is outputted from the rotary encoder 209, according to the control sequence which has been determined in advance. By such control, the control unit 50 makes the transporting roller 201 rotate, and sends the paper Q by a predetermined amount to a downstream (side) in the secondary scanning direction. The predetermined amount corresponds to a width in the secondary scanning direction of the line image formed on the paper Q in the line-image formation process every time.

As the sending process is terminated, the control unit 50 executes the line-image formation process once again, and forms a subsequent line image on the paper Q. The control unit 50 executes such line-image formation process and sending process repeatedly till the image formation on the paper Q is completed for all lines. As the line-image formation process for all lines is over, the control unit 50 controls the LF motor M1 according to the control sequence which has been determined in advance, and discharges the paper Q. As the print command is input from the external apparatus 3, the control unit 50 forms a series of images based on the image data to be printed, by executing such printing process for each page.

Figure 4:
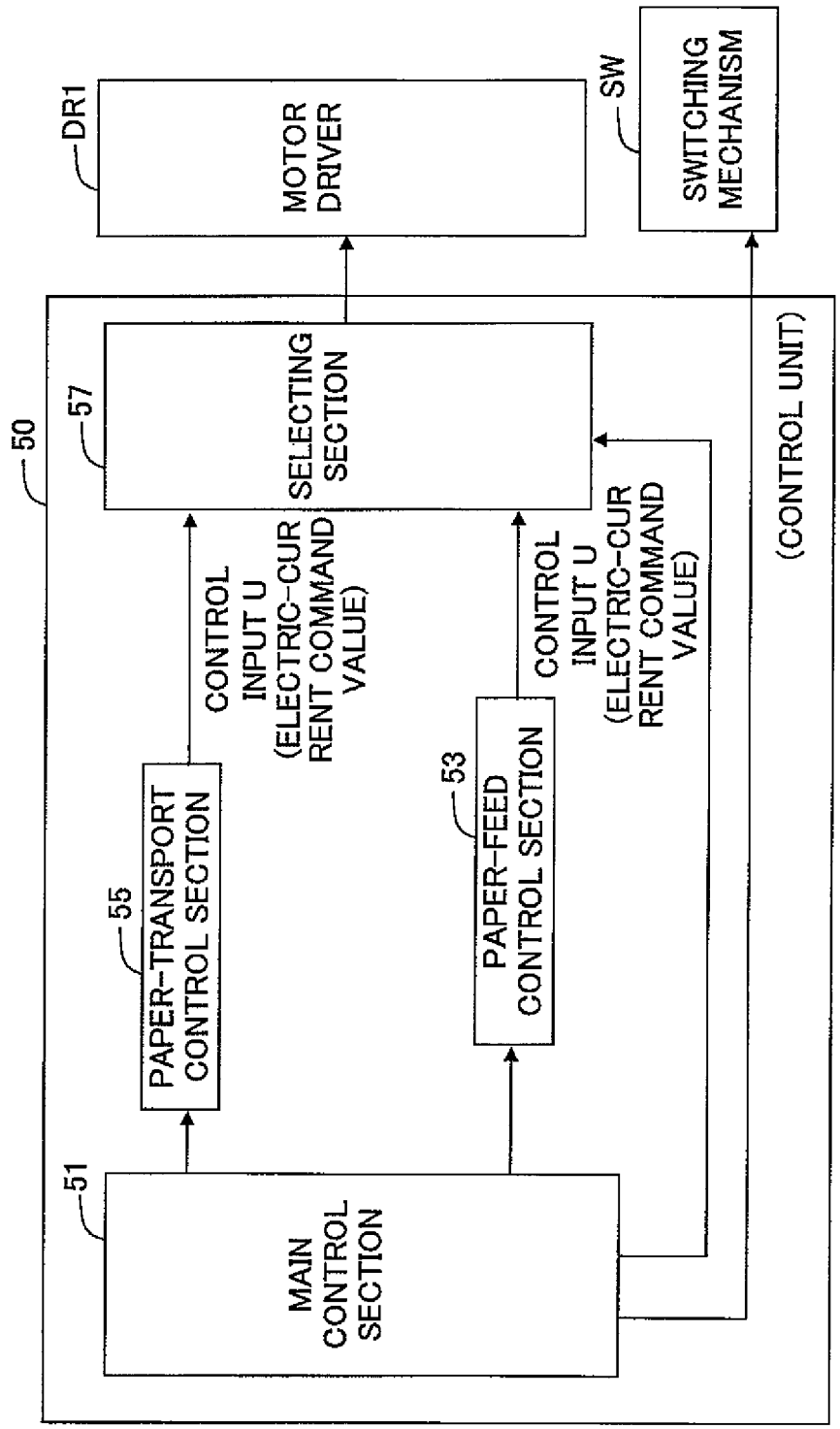
FIG. 4 is a block diagram showing a structure of a control unit.

Components of the control unit 50 involved in the control of the LF motor M1 will be described below while referring to FIG. 4. In FIG. 4, the components involved in the control of the LF motor M1 in particular, out of the components of the control unit 50 are shown.

The control unit 50, as shown in FIG. 4, includes a main control section 51, a paper-feed control section 53, a paper-transport control section 55, and a selecting section 57. The main control section 51 controls execution of a series of processes when the print command has been input from the external apparatus 3. The main control section 51 executes a series of processes from paper feeding up to paper discharge by inputting to each section of the apparatus.

Figure 5A:
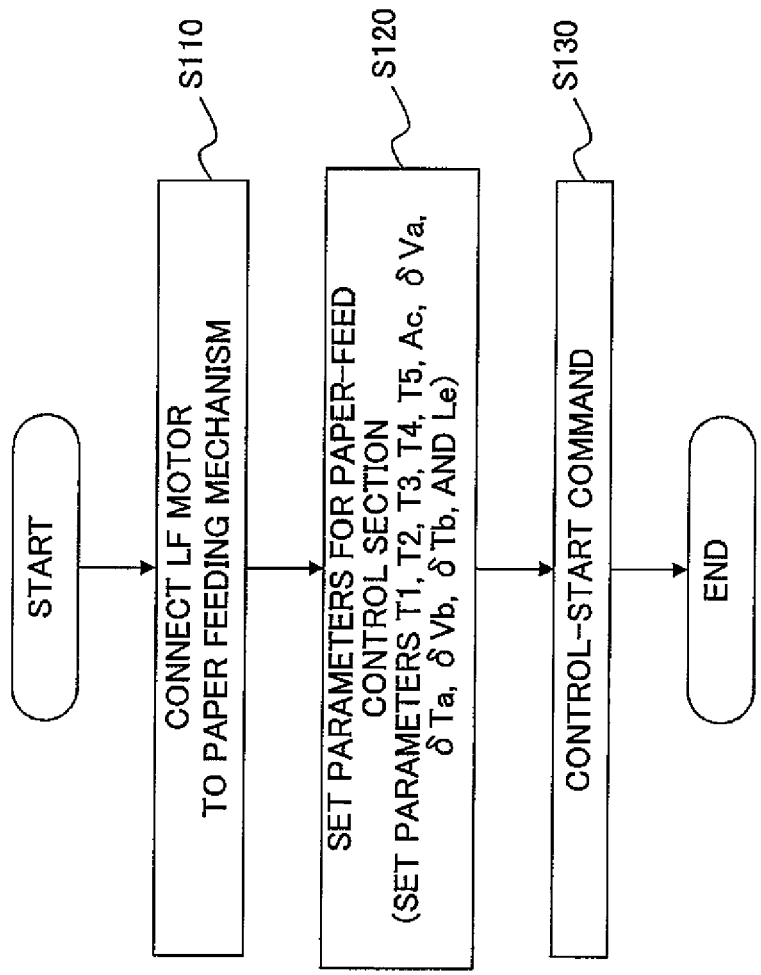
FIG. 5A is a flowchart of a processing which is executed by a main control section as a part of a paper feeding process.

The main control section 51, at the time executing the paper feeding process of feeding the paper Q to the paper transporting mechanism 20, as shown in FIG. 5A, connects the LF motor M1 to the paper feeding mechanism 10 by controlling the switching mechanism SW (S110). Moreover, the main control section 51 sets control parameters T1, T2, T3, T4, T5, and Ac which define a control sequence which is to be realized by the paper-feed control section 53, correction parameters δVa, δTa, δVb, and δTb which define a correction method of the control sequence, and a target transporting amount Le of the paper Q according to the control sequence, in the paper-feed control section 53 (S120). The abovementioned control parameters and the correction parameters are stored in a register which is not shown in the diagram. Furthermore, A control-start command is input to the paper-feed control section 53 (S130) while switching an output of the selecting section 57 such that an control input U which is outputted from the paper-feed control section 53 is input to the motor driver DR 1 via the selecting section 57. Accordingly, the main control section 51 makes the paper-feed control section 53 control the LF motor M1 according to the control parameters, and picks up one of the papers Q placed on the paper feeding tray 101 and transports by the target transporting amount Le, and feeds to the paper-transporting mechanism 20. Moreover, in a case in which an electric-current saturation phenomenon which is caused due to a counter electromotive force has occurred in the LF motor M1, the main control section 51 corrects the control sequence according to the correction parameters.

Figure 5B:
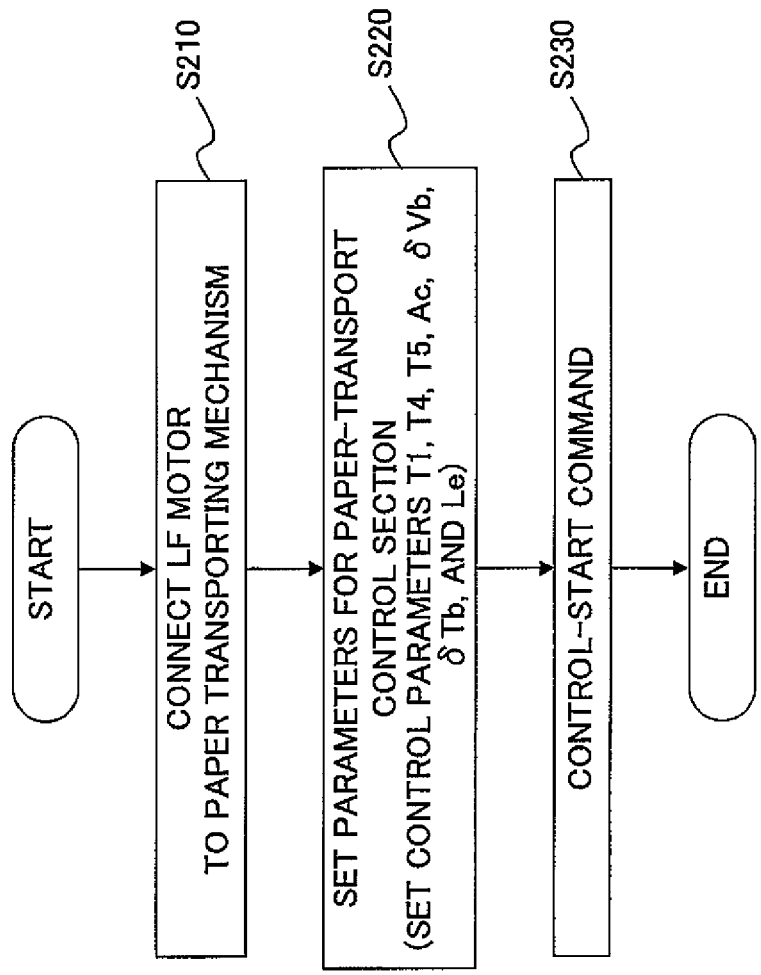
FIG. 5B is a flowchart of a processing which is executed by the main control section as a part of a paper transporting process.

Whereas, the main control section 51, in a case of executing the process of locating front end of paper and the sending process of the paper Q by the paper transporting mechanism 20, as shown in FIG. 5B, connects the LF motor M1 to the paper transporting mechanism 20 by controlling the switching mechanism SW (S210). Moreover, the main control section 51 sets control parameters T1, T4, T5, and Ac which define a control sequence which is to be realized by the paper-transport control section 55, correction parameters δVb and δTb of the control section, and a target transporting amount Le of the paper Q, in the paper-transport control section 55 (S220). Furthermore, a control-start command is input to the paper-transport control section 55 (S230) while switching an output of the selecting section 57 such that an operation amount U which is outputted from the paper-transporting control 55 is input to the motor driver DR1 via the selecting section 57. Accordingly, the main control section 51 makes the paper-transport control section 55 control the LF motor M1 according to the control parameters, and realizes a transporting operation of one batch of the paper Q corresponding to the process of locating front end of paper or the sending process by the paper transporting mechanism 20. Hereinafter, for expressing the process of locating front end of paper and the sending process without distinguishing, the two processes will be expressed as a "paper transporting process".

Moreover, the paper-feed control section 53 and the paper-transport control section 55, when the control-start command is input, carry out a driving control of the LF motor M1 by calculating repeatedly the operation amount U for the LF motor M1, according to the control parameters which have been set from the main control section 51. As the operation amount U, it is possible to output an electric-current command value which is a command value of a drive electric current to be applied to the LF motor M1. When such electric-current command value is input as the operation amount, the motor driver DR1 applies a drive electric current corresponding to the electric-current command value to the LF motor M1.

The paper-feed control section 53, by outputting the operation amount U, picks up one of the papers Q placed on the paper feeding tray 101, via the paper feeding mechanism 10, and feeds to the paper transporting mechanism 20. On the other hand, the paper-transport control section 55, by outputting the operation amount U, realizes the process of locating the front end of paper Q and sending the paper Q which has been fed to the paper transporting mechanism 20 from the paper feeding mechanism 10.

The selecting section 57, by being controlled by the main control section 51, inputs any one of the operation amount U which is outputted from the paper-feed control section 53 and the operation amount which is outputted from the paper-transport control section 55, to the motor driver DR1.

Figure 6A:
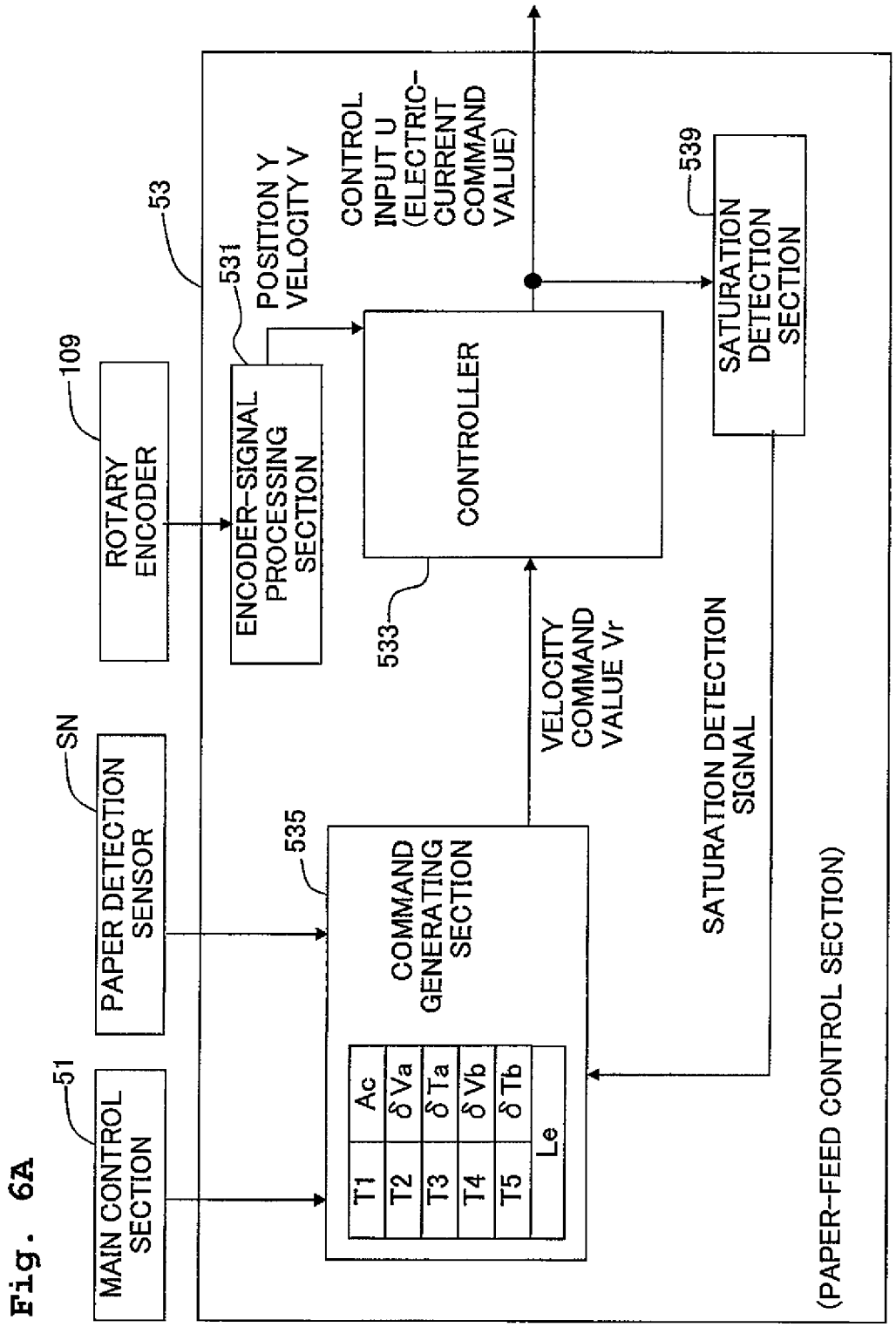
FIG. 6A is a block diagram showing a configuration of a paper-feed control section.

Next, a detail configuration of the paper-feed control section 53 will be described below. The paper-feed control section 53 which controls the LF motor M1 till feeding the paper Q to the paper transporting mechanism 20, includes an encoder-signal processing section 531, a controller 533, a command generating section 535, and a saturation detection section 539 as shown in FIG. 6A.

The encoder-signal processing section 531 measures an amount of rotation YF and a rotational velocity VF of the paper feeding roller 103, based on an encoder signal which is input from the rotary encoder 109. As it has been mentioned above, the paper Q is transported by the rotation of the paper feeding roller 103. Therefore, an amount of change in the amount of rotation YF of the paper feeding roller 103 corresponds to a transporting amount of the paper Q at that time. In other words, the encoder-signal processing section 531 measures a transporting position and a transporting velocity of the paper Q indirectly by measuring the amount of rotation YF and the rotational velocity VF of the paper feeding roller 103. In the following description, the value YF measured by the encoder-signal processing section 531 is expressed also as a (transporting) position Y of the paper Q, and the value VF measured by the encoder-signal processing section 531 is expressed as a (transporting) velocity V of the paper Q. The measured value YF which the encoder-signal processing section 531 retains, indicates the transporting amount of the paper Q (transporting position of the paper Q with a paper-feeding starting point let to be a base) by the paper feeding mechanism 10 from paper-feeding process starting time, upon being initialized to zero, by the main control section 51 at the time of start of the paper feeding process.

The controller 533, based on the position Y and the velocity V which are input from the encoder-signal processing section 531, and a velocity command value Vr which is input from the command generating section 535, calculates the operation amount U for the LF motor M1, and outputs the operation amount U which has been calculated. In other words, the controller 533 outputs the operation amount U for the LF motor M1 such that the velocity V of the paper Q follows the velocity command value Vr which is input from the command generating section 535, in the paper feeding mechanism 10. As the controller 533, it is possible to use a controller such as a known PID (proportional integral derivative) controller.

The command generating section 535 outputs the velocity command value Vr at each time from a point of time of start of the control, according to a control sequence which is defined by the control parameters T1, T2, T3, T4, T5, and Ac which have been set from the main control section 51. In FIG. 7A, a trajectory of the velocity command value Vr according to the control parameters T1, T2, T3, T4, T5, and Ac set from the main control section 51 at step S120, is shown.

As shown in FIG. 7A, the control sequence of the paper feeding process includes an acceleration control phase [1] of controlling the LF motor M1 such that, the paper Q is accelerated up to a velocity Va=Ac·T1, a constant-velocity control phase [2] of controlling the LF motor M1 such that the velocity V of the paper Q becomes a constant velocity Va, after the end of the acceleration control phase [1], an acceleration control phase [3] of controlling the LF motor M1 such that the paper Q is accelerated up to a velocity Vb=Ac·(T1+T3) which is higher than the velocity Va, after the end of the constant-velocity control phase [2], a constant-velocity control phase [4] of controlling the LF motor M1 such that the velocity V of the paper Q becomes the constant velocity Vb, after the end of the acceleration control phase [3], and a deceleration control phase [5] of controlling the LF motor M1 such that, the paper Q is decelerated from the velocity Vb to zero, and stops at a point after advancing by the target transporting amount Le from the time of start of transporting.

The target transporting amount Le is set such that the paper Q stops at a point which is isolated by a distance Lz to a downstream (side) in the transporting direction from a point at which, the paper detection sensor SN is switched to an ON signal. A point isolated by the distance Lz is a point where a front end of the paper Q reaches the paper transporting mechanism 20.

As it is evident from FIG. 7A also, the control parameter T1 indicates a control time in the acceleration control phase [1], the control parameter T2 indicates a control time in the constant-velocity control phase [2], the control parameter T3 indicates a control time in the acceleration control phase [3], the control parameter T4 indicates a control time of the constant-velocity control phase [4], and the control parameter T5 indicates a control time in the deceleration control phase [5]. Moreover, the control parameter Ac indicates an acceleration of the paper Q in the acceleration control phases [1] and [3]. In the following description, the control parameters T1, T2, T3, T4, and T5 (hereinafter, "control parameters T1 to T5") are also expressed as control time T1, T2, T3, T4, and T5 (hereinafter, "control time T1 to T5").

The acceleration control phase [1] and the constant-velocity control phase [2] in the paper feeding process are phases for transporting the paper Q at a low velocity and for picking up the paper Q assuredly, in a process till the end of picking up from a paper Q which is under the paper Q at the top of the papers Q in the paper feeding tray 101. In a case in which a claw 113 which assists the picking up of the paper Q is provided in the paper transporting path from the paper feeding mechanism 10 up to the paper transporting mechanism 20, it is possible to determine the control time T1 and T2 in the paper feeding process such that, the phase shifts from the constant-velocity control phase [2] to the acceleration control phase [3] at a point of time when the front end of the paper Q has passed the claw 113, and has been picked up assuredly from the paper of a lower layer.

The saturation detection section 539 inputs a saturation detection signal which indicates that the electric-current saturation phenomenon has occurred in the LF motor M1, to the command generating section 535. The saturation detection section 539 is capable of judging whether or not the electric-current saturation phenomenon has occurred in the LF motor M1, by judging whether or not the operation amount U which is outputted from the controller 533 is equal to or more than an upper limit value Umax of a drive electric current which can be applied to the LF motor M1. As the upper limit value Umax, it is possible to use a value Umax=Umax0−ΔU(ω) which is obtained by subtracting a reduced amount (an amount reduced) ΔU(ω) which is caused due to a counter electromotive force from the upper limit value Umax0 in a case in which the counter electromotive force is not generated in the LF motor M1 presumably. As it is universally known, the reduced amount ΔU(ω) becomes large as a rotational velocity ω of the LF motor M1 becomes high. It is possible to specify the value of ΔU(ω) by a computation using the velocity V which is obtained from the encoder-signal processing section 531.

The command generating section 535, in a case in which such saturation detection signal has been input from the saturation detection section 539, corrects the velocity command value Vr from that point of time onward by using the correction parameters δVa, δTa, δVb, and δTb according to the requirement, and lowers from a value at the beginning, as shown in FIG. 10, FIG. 13, FIG. 15, and FIG. 17. Accordingly, the electric-current saturation phenomenon in the LF motor M1 is eliminated. Moreover, the control time T4 is corrected such that, the paper Q is transported by the target transporting amount Le only, even by the correction of the velocity command value Vr (details of the correction will be described later). In other words, according to the first embodiment, a timing of shift to the deceleration control phase [5] and a timing of stopping the paper Q are to be adjusted by the correction of the control time T4.

Figure 6B:
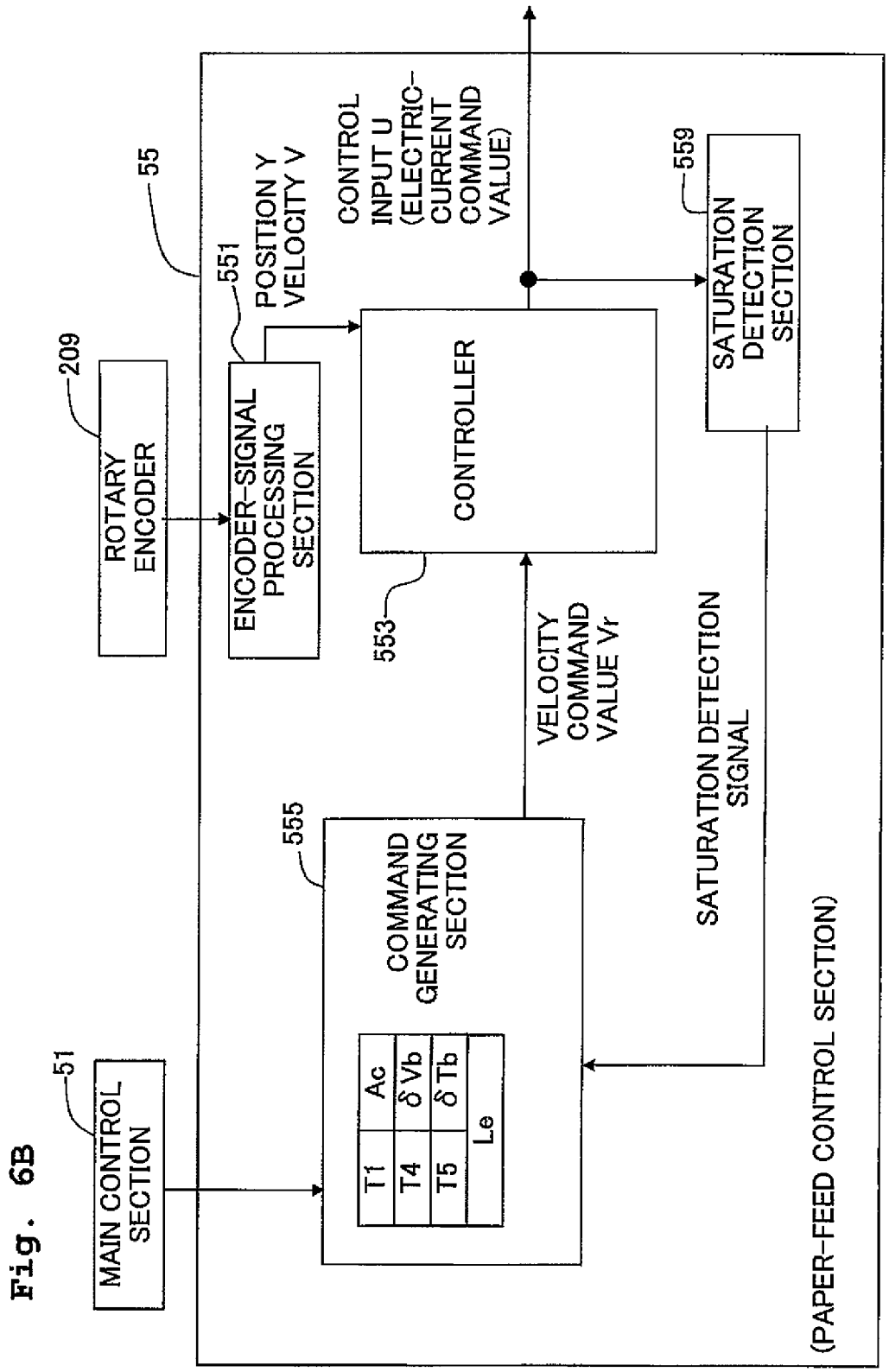
FIG. 6B is a block diagram showing a configuration of a paper-transport control section.

Even the paper-transport control section 55, similarly as the paper-feed control section 53, includes an encoder-signal processing section 551, a controller 553, a command generating section 555, and a saturation detection section 559 (refer to FIG. 6B).

The encoder-signal processing section 551 measures an amount of rotation YL and a rotational velocity VL of the transporting roller 201, based on an encoder signal which is input from the rotary encoder 209. The encoder-signal processing section 551 measures a transporting position and a transporting velocity of the paper Q indirectly by measuring the amount of rotation YL and the rotational velocity VL of the transporting roller 201. In the following description, the value YL measured by the encoder-signal processing section 551 is expressed also as a (transporting) position Y of the paper Q, and the value VL measured by the encoder-signal processing section 551 is also expressed as a (transporting) velocity V. The measured value YL which the encoder-signal processing section 551 retains, indicates the transporting amount of the paper Q (transporting position of the paper Q with a paper-transporting starting point let to be a base) by the paper transporting mechanism 20 from paper-transporting starting time, upon being initialized to zero, by the main control section 51 at the time of start of the paper transporting process.

For the controller 553, a controller such as a known PID controller is used, similarly as for the controller 533. The controller 553, based on the position Y and the velocity V which are input from the encoder-signal processing section 551, and a velocity command value Vr which is input from the command generating section 555, computes the operation amount U for the LF motor M1, and outputs the operation amount U which has been calculated such that, the velocity V of the paper Q follows the velocity command value Vr input from the command generating section 555, in the paper transporting mechanism 20.

The command generating section 555 outputs the velocity command value Vr at each time from a point of time of start of control, according to a control sequence which is defined by the control parameters T1, T4, T5, and Ac which have been set from the main control section 51. In FIG. 7B, a trajectory of the velocity command value Vr according to the control parameters T1, T4, T5, and Ac set from the main control section 51 at step S220, is shown.

As shown in FIG. 7B, the control sequence of the paper transporting process includes an acceleration control phase [1] of controlling the LF motor M1 such that, the paper Q is accelerated up to a velocity Vb=Ac·T1, a constant-velocity control phase [4] of controlling the LF motor M1 such that the velocity V of the paper Q becomes the constant velocity Vb, after the end of the acceleration control phase [1], and a deceleration control phase [5] of controlling the LF motor M1 such that, paper Q is decelerated from the velocity Vb to zero, and stops at a point after advancing by the target transporting amount Le from the time of start of transporting.

In other words, the control sequence of the paper transporting process has an arrangement in which the constant-velocity control phase [2] and the acceleration control phase [3] are omitted from the control sequence of the paper feeding process. The control time T1 of the acceleration control phase [1], the control time T4 of the constant-velocity control phase [4], and the control time T5 of the deceleration control phase [5] are determined by a designer such that, the paper Q stops at a point after advancing only by the target transporting amount Le, and are set in the command generating section 555 by a processing at step S220 by the main control section 51. As a matter of course, the target transporting amount Le differs for each of the process of locating the front end of paper and the sending process.

The saturation detection section 559 inputs a saturation detection signal which indicates that the electric-current saturation phenomenon has occurred in the LF motor M1, to the command generating section 555. The saturation detection section 559, similarly as the saturation detection section 539, makes a judgment of whether or not the electric-current saturation phenomenon has occurred, based on the operation amount U which is outputted from the controller 553.

Figure 22:
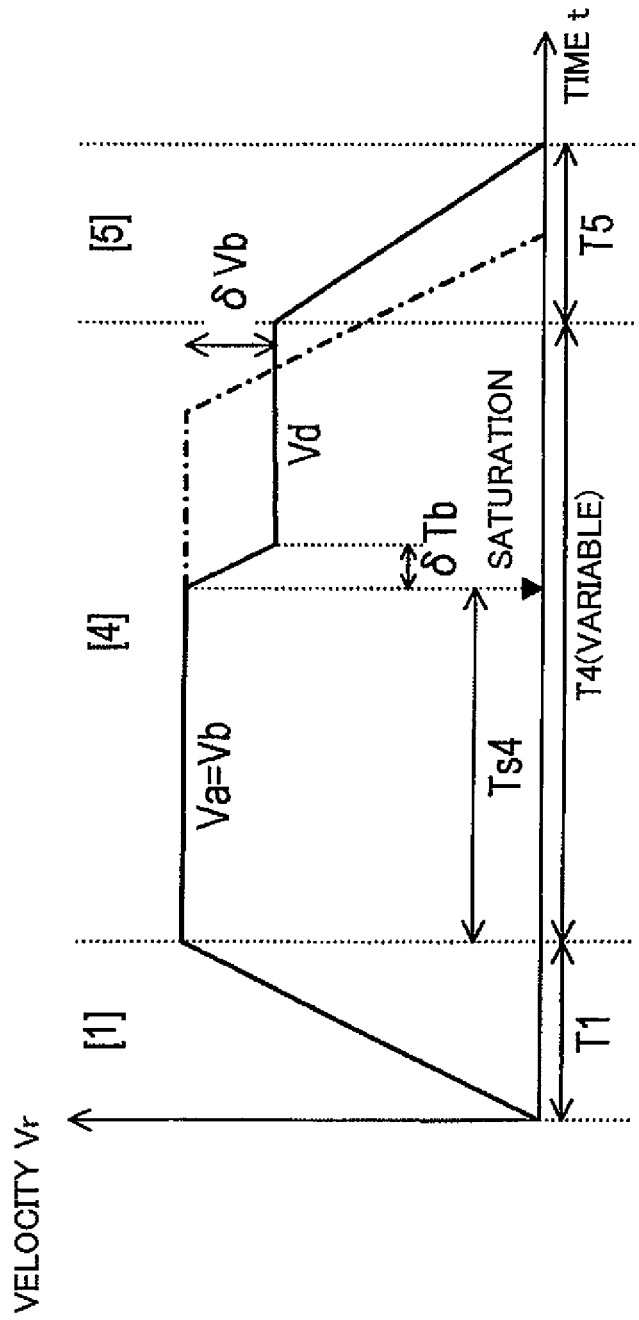
FIG. 22 is a graph showing a trajectory of the velocity command value in a case that the electric-current saturation phenomenon has occurred in the constant-velocity control phase at the time of executing the paper-transport control processing.

The command generating section 555, in a case in which such saturation detection has been input from the saturation detection section 539, corrects the velocity command value Vr from that point of time onward by using the correction parameters δVb and δTb according to the requirement, and lowers from a value at the beginning, as shown in FIG. 22. Accordingly, the electric-current saturation phenomenon in the LF motor M1 is eliminated. Moreover, the control time T4 is corrected such that, the paper Q is transported by the target transporting amount Le only even by the correction of the velocity command value Vr.

Next, the paper-feed control processing which, the command generating section 535 of the paper-feed control section 53 executes after the control-start command has been input from the main control section 51, will be described below while referring to FIG. 8. The command generating section 535 of the paper-feed control section 53 executes the paper-feed control processing repeatedly according to a control cycle.

Figure 8:
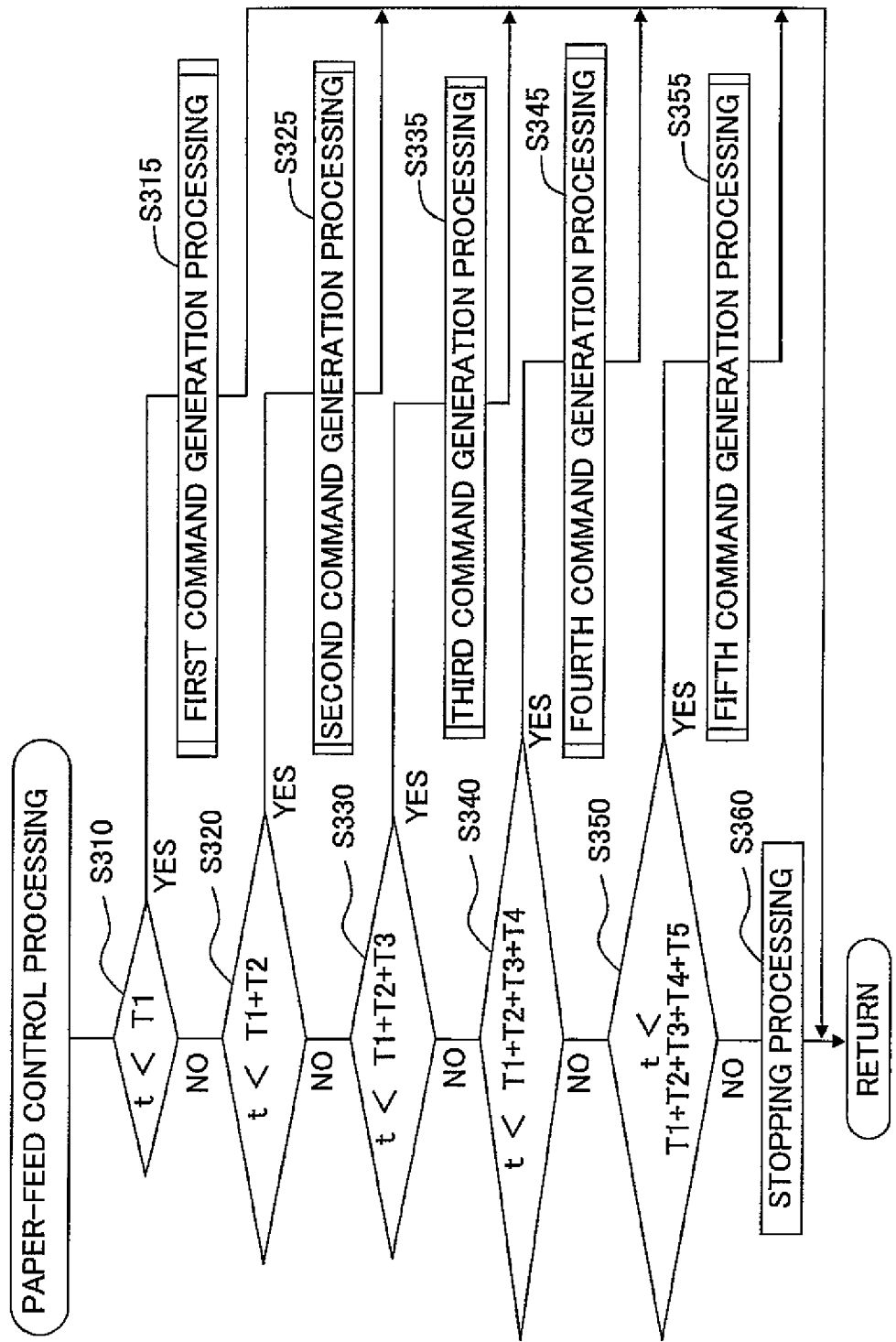
FIG. 8 is a flowchart showing a paper-feed control processing by the command generating section.

As the paper-feed control processing shown in FIG. 8 starts, the command generating section 535, to start with, makes a judgment of whether or not the current phase is the acceleration control phase [1] by making a judgment of whether or not an elapsed time t after a point of time of start of control (a point of time at which a control-start command is inputted) of the LF motor M1 based on the control-start command is less than the control time T1 which has been set by the main control section 51 (S310). Moreover, when the command generating section 535 makes a judgment that the elapsed time t is less than the control time T1 (Yes at S310), the command generating section 535 executes a first command generation processing of computing the velocity command value Vr corresponding to the acceleration control phase [1], and outputting the velocity command value Vr which has been computed (S315). Thereafter, the command generating section 535 terminates the paper-feed control processing once till incoming of the subsequent control cycle.

Whereas, when the command generating section 535 makes a judgment at step S310 that the elapsed time t is not less than the control time T1, the process shifts to step S320. At step S320, the command generating section 325 makes a judgment of whether or not the current phase is the constant-velocity control phase [2] by making a judgment of whether or not the elapsed time t at the current point of time is less than a time T1+T2 which is a combined value of the control time T1 and T2. Moreover, when a judgment is made that the elapsed time t is less than the time T1+T2 (Yes at S320), the command generating section 535 executes a second command generation processing of computing the velocity command value Vr corresponding to the constant-velocity control phase [2], and outputting the velocity command value Vr which has been computed (S325). Thereafter, the command generating section 535 terminates the paper-feed control processing temporarily till incoming of the subsequent control cycle.

Moreover, as the command generating section 535 makes a judgment at step S320 that the elapsed time t is not less than the time T1+T2, the process shifts to step S330. At step S330, the command generating section 535 makes a judgment of whether or not the current phase is the acceleration control phase [3] by making a judgment of whether or not the elapsed time t is less than a time T1+T2+T3. Moreover, when the command generating section 535 makes a judgment that the elapsed time t is less than the time T1+T2+T3 (Yes at S330), the command generating section 535 executes a third command generation processing of computing the velocity command value Vr corresponding to the acceleration control phase [3], and outputting the velocity command value Vr which has been computed (S335). Thereafter, the command generating section 535 terminates the paper-feed control processing temporarily till incoming of the subsequent control cycle.

Moreover, as the command generating section 535 makes a judgment at step S330 that the elapsed time t is not less than T1+T2+T3, the process shifts to step S340. At step S340, the command generating section 535 makes a judgment of whether or not the current phase is the constant-velocity control phase [4], by making a judgment of whether or not the elapsed time t is less than a time T1+T2+T3+T4. Moreover, when the command generating section 535 makes a judgment that the elapsed time t is less than T1+T2+T3+T4 (Yes at S340), the command generating section 535 executes a fourth command generation processing of computing the velocity command value Vr corresponding to the constant-velocity control phase [4], and outputting the velocity command value Vr which has been calculated (S345). Thereafter, the command generating section 535 terminates the paper-feed control processing temporarily till incoming of the subsequent control cycle.

Moreover, as the command generating section 535 makes a judgment at step S340 that the elapsed time t is not less than the time T1+T2+T3+T4, the process shifts to step S350. At step S350, the command generating section 535 makes a judgment of whether or not the current phase is the deceleration control phase [5], by making a judgment of whether or not the elapsed time t is less than a time T1+T2+T3+T4+T5. Moreover, when the command generating section 535 makes a judgment that the elapsed time t is less than the time T1+T2+T3+T4+T5 (Yes at S350), the command generating section 535 executes a fifth command generation processing of computing the velocity command value Vr corresponding to the deceleration control phase [5], and outputting the velocity command value Vr which has been calculated (S355). Thereafter, the command generating section 535 terminates the paper-feed control processing temporarily till incoming of the subsequent control cycle.

Moreover, as the command generating section 535 makes a judgment at step S350 that the elapsed time t is not less than the time T1+T2+T3+T4+T5, the process shifts to step S360. At steps S360, the command generating section 535 executes a stopping processing of outputting a value zero as a constant time and velocity command value Vr. Thereafter, the command generating section 535 terminates a repeated operation of the paper-feed control processing. In the first embodiment, in such manner, the velocity command value Vr corresponding to each phase is computed for each control cycle, and outputted.

Figure 9:
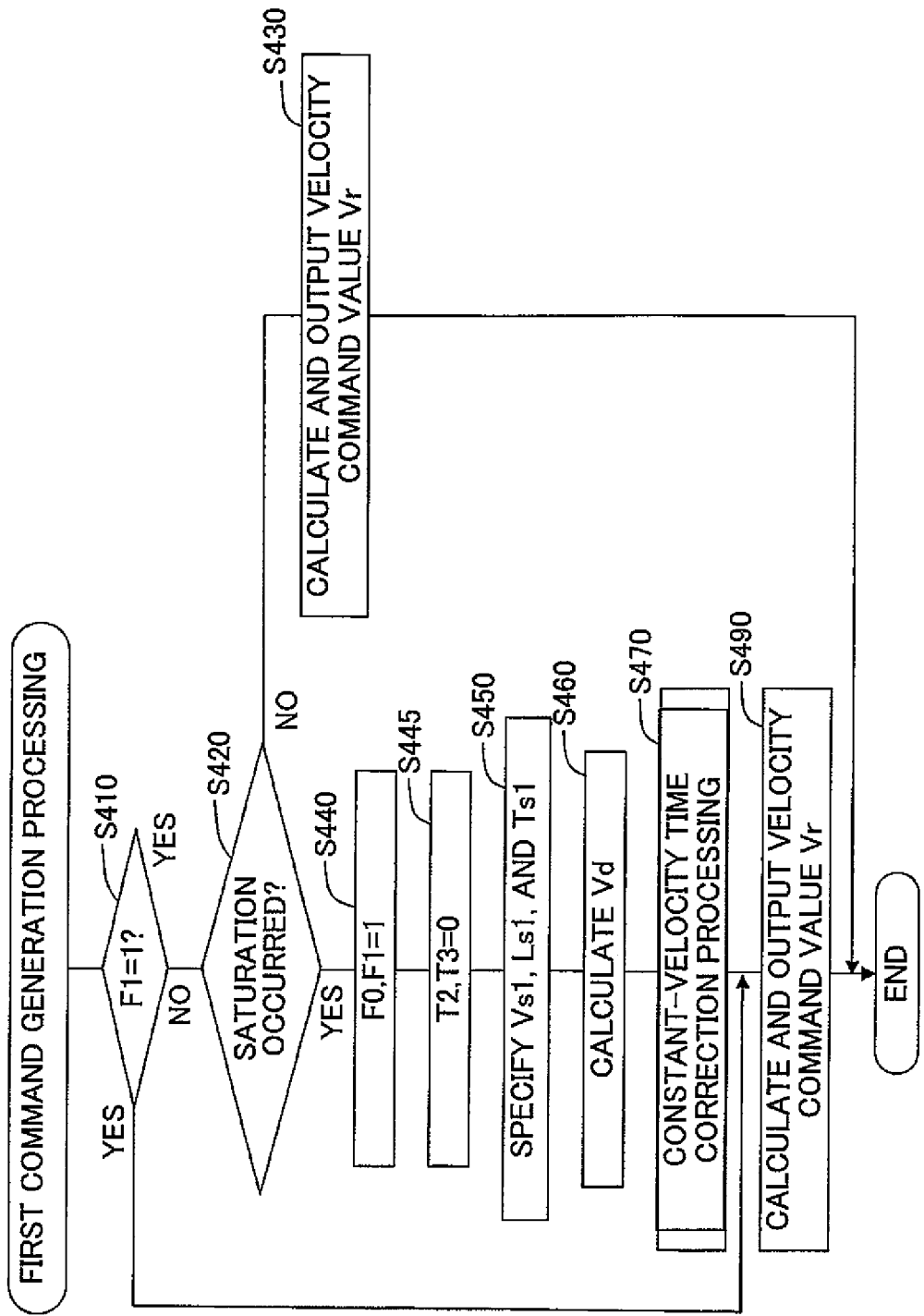
FIG. 9 is a flowchart showing a first command generation processing by the command generating section.

Next, details of the first command generation processing which the command generating section 535 executes at step S315 will be described below while referring to FIG. 9, FIG. 10, and FIG. 11 (hereinafter, "FIG. 9 to FIG. 11"). As the first command generation processing starts, the command generating section 535, first of all, makes a judgment of whether or not a value "1" has been set for a flag F1. When the command generating section 535 makes a judgment that the value "1" has been set for the flag F1 (Yes at S410), the process shifts to step S490. When the command generating section 535 makes a judgment that the value "1" has not been set for the flag F1 (F1=0) (No at S410), the process shifts to step S420. The flag F1, together with flags F0, F2, F3, and F4 which will be described later, is reset to a value "0" by the command generating section 535 at a point of time of inputting the control-start command.

As the process shifts to step S420, the command generating section 535 makes a judgment of whether or not the electric-current saturation phenomenon has occurred in the LF motor M1 by making a judgment of whether or not a saturation detection signal has been input from the saturation detection section 539. When the command generating section 535 makes a judgment that the electric-current saturation phenomenon has not occurred in the LF motor M1 (No at S420), the process shifts to step S430. At step S430, the command generating section 535 calculates the velocity command value Vr by Ac·t, based on the elapsed time t at the current point of time and the control parameter Ac, and outputs the velocity command value Vr which has been calculated. Thereafter, the command generating section 535 terminates the first command generation processing. By this processing, the velocity command value Vr of the acceleration control phase [1] as shown in FIG. 7A is input to the controller 533.

Whereas, as the command generating section 535 makes a judgment that the electric-current saturation phenomenon has occurred in the LF motor M1 (Yes at S420), the command generating section 535 shifts the process to step S440, and sets the value "1" for the flag F1 and the flag F0. The flag F1 indicates whether or not the electric-current saturation phenomenon has occurred in the acceleration control phase [1], and the flag F0 indicates whether or not the electric-current saturation phenomenon has occurred during a period from the acceleration control phase [1] up to the constant-velocity control phase [4].

Moreover, after the processing at step S440, the command generating section 535 executes a processing of correcting the control time T2 and T3 to zero as one of the processing of correcting the control sequence after the occurrence of the electric-current saturation phenomenon (S445). Thereafter, the command generating section 535 specifies a velocity Vs1 and a transporting amount Ls1 of the paper Q at a point of time of occurrence of the electric-current saturation phenomenon, and a control time Ts1 till the point of time of occurrence of the electric-current saturation phenomenon in the acceleration control phase [1] (S450). The transporting amount Ls1 is a transporting amount of the paper Q from a point of time of input (t=0) of the control-start command up to the point of time of occurrence of the electric-current saturation phenomenon, and the control time Ts1, as shown in FIG. 10, is a length of time from a point of time of start (t=0) of the acceleration control phase [1] up to the point of time of occurrence of the electric-current saturation phenomenon (t=Ts1). In this case, it is possible to specify the current velocity command value Vr as the velocity Vs1, and to specify an integral value of the velocity command value Vr up to the current point of time as the transporting amount Ls1.

After the processing at step S450, the command generating section 535, as one of the further processing of correcting the control sequence after the occurrence of the electric-current saturation phenomenon, corrects a target transporting velocity in the constant-velocity control phases [2] and [4] after the occurrence of the electric-current saturation phenomenon, and lowers from the target transporting velocity Va=Ac·T1 in the constant-velocity control phase [2] at the beginning and the target transporting velocity Vb=Ac (T1+T3) in the constant-velocity control phase [4] (S460). Concretely, the command generating section 535, based on the control parameters Ac and T1, the control time Ts1, and the velocity Vs1 of the paper at the point of time of occurrence of the electric-current saturation phenomenon, which have been specified, calculates a target transporting velocity Vd after the correction according to the following expression.

$$Vd=Vs1+Ac\cdot(T1-Ts1)/3$$

Thereafter, the command generating section 535, by executing a constant-velocity time correction processing (of which details will be described later), corrects the control time T4 in the constant-velocity control phase [4] such that the paper Q stops at a point (target position) corresponding to the target transporting amount Le (S470), as one of the processing for correcting the control sequence after the occurrence of the electric-current saturation phenomenon. Thereafter, the process shifts to step S490.

Moreover, at step S490, the command generating section 535, calculates the velocity command value Vr according to the following conditional expression, as the velocity command value Vr in the acceleration control phase [1] after the occurrence of the electric-current saturation phenomenon.

$$Vr=Vs1+Ac \cdot (t-T1)^3/\{3 \cdot (Ts1-T1)^2\}-Ac \cdot (Ts1-T1)/3$$

The command generating section 535 calculates the velocity command value Vr according to the abovementioned expression, based on the control parameters Ac and T1, the control time Ts1, and the velocity Vs1 at the point of time of occurrence of the electric-current saturation phenomenon, and the elapsed time t at the current point of time, and outputs the velocity command value Vr which has been calculated, to the controller 533. Thereafter, the command generating section 535 terminates the first command generation processing.

As the electric-current saturation phenomenon occurs in the acceleration control phase [1], the processing at step S490 is executed repeatedly along with the flag F1 at step S440 being set to the value "1". The command generating section 535, in such manner, outputs the velocity command value Vr at each time t (elapsed time t) according to the abovementioned expression to the controller 533, after the occurrence of the electric-current saturation phenomenon. Accordingly, as shown in FIG. 10 and FIG. 11, the paper Q is shifted to a constant-velocity state along a trajectory of the velocity command value Vr according to the abovementioned expression, lower than the velocity command value Vr=Ac·t when the electric-current saturation phenomenon has not occurred, and a trajectory of an acceleration $Ac \cdot (t-T1)^2/(Ts1-T1)^2$ lower than the acceleration Ac when the electric-current saturation phenomenon has not occurred. The trajectory of acceleration shown in a lower part of FIG. 11 is a trajectory based on the acceleration Ac at the point of time when the electric-current saturation phenomenon has occurred, and the time when the electric-current saturation phenomenon has occurred, and is indicated by a quadratic function which is convex at a lower side such that the acceleration at the time T1 becomes zero, and the acceleration continues smoothly before and after the time T1. In a case in which the paper Q is shifted to the constant-velocity state according to the abovementioned expression, the velocity command value Vr of the paper Q at time t=T1 of end of the acceleration control phase [1] becomes the target transporting velocity Vd which is calculated at step S460.

Figure 11:
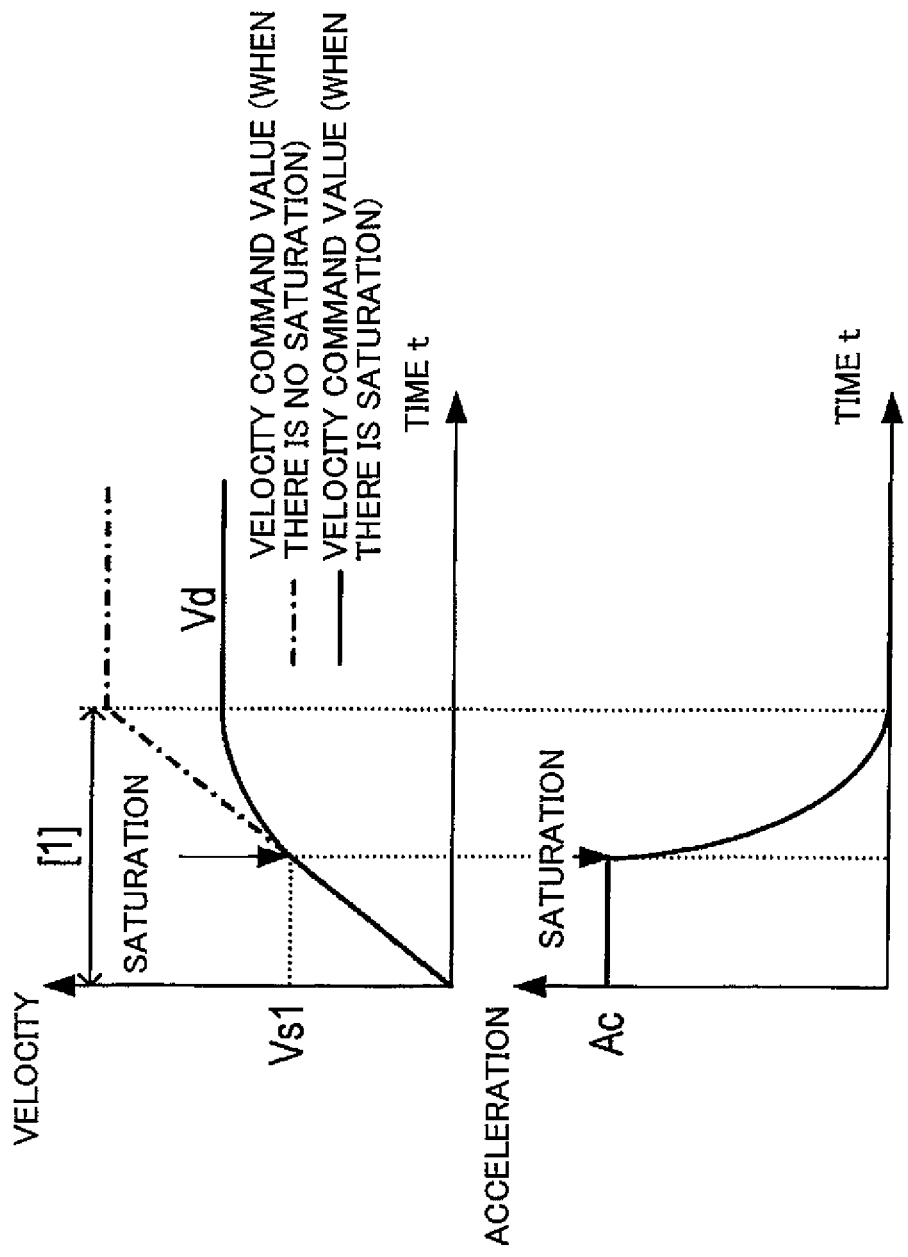
FIG. 11 is a diagram showing how the velocity command value is corrected in the acceleration control phase.

A graph of an upper part in FIG. 11 indicates the trajectory of the acceleration command value Vr in the acceleration control phase [1], and the trajectory when the electric-current saturation phenomenon has occurred is indicated by a solid line, and the trajectory when the electric-current saturation phenomenon has not occurred is indicated by an alternate dotted and dashed line. In other words, the trajectory of the velocity command value Vr calculated according to the abovementioned expression is indicated by the solid line. Moreover, the graph at the lower part in FIG. 11 indicates a trajectory of a derivative value (acceleration command value) Ar of the velocity command value Vr when the electric-current saturation phenomenon has occurred.

Figure 10:
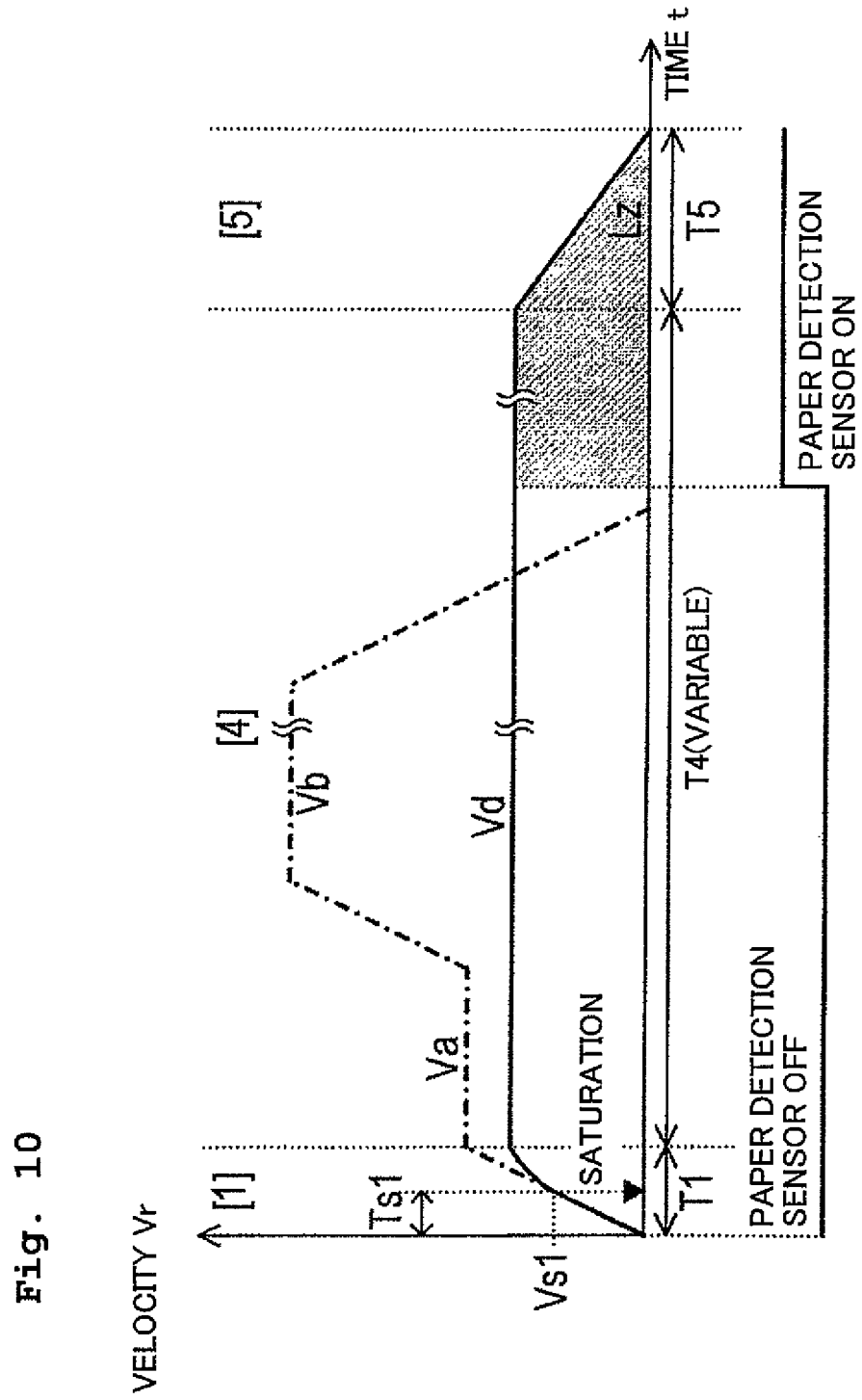
FIG. 10 is a graph showing a trajectory of the velocity command value in a case that an electric-current saturation phenomenon has occurred in an acceleration control phase at the time of executing the paper-feed control processing.

In such manner, in the first embodiment, in a case in which the electric-current saturation phenomenon does not occur in the acceleration control phase [1], the paper-feeding control of the paper Q is carried out to be along the trajectory of the velocity command value Vr indicated by the alternate dotted and dashed line in FIG. 10, whereas, in a case in which the electric-current saturation phenomenon has occurred in the acceleration control phase [1], the paper-feeding control of the paper Q is carried out to be along the trajectory of the velocity command value Vr indicated by the solid line in FIG. 10. In the case in which the electric-current saturation phenomenon has occurred in the acceleration control phase [1], since the control time T2 and T3 change to zero, the control sequence after the occurrence of the electric-current saturation phenomenon skips the constant-velocity control phase [2] and the acceleration control phase [3] after the end of the acceleration control phase [1], and is corrected to a control sequence of shift to the constant-velocity control phase [4] of controlling the paper Q to a constant velocity of the target transporting velocity Vd. Similarly as in FIG. 10 and FIG. 11, in FIG. 13, FIG. 15, FIG. 17, and FIG. 22, the trajectory of the velocity command value Vr when the electric-current saturation phenomenon has not occurred is indicated by the alternate dotted and dashed line.

Figure 12A:
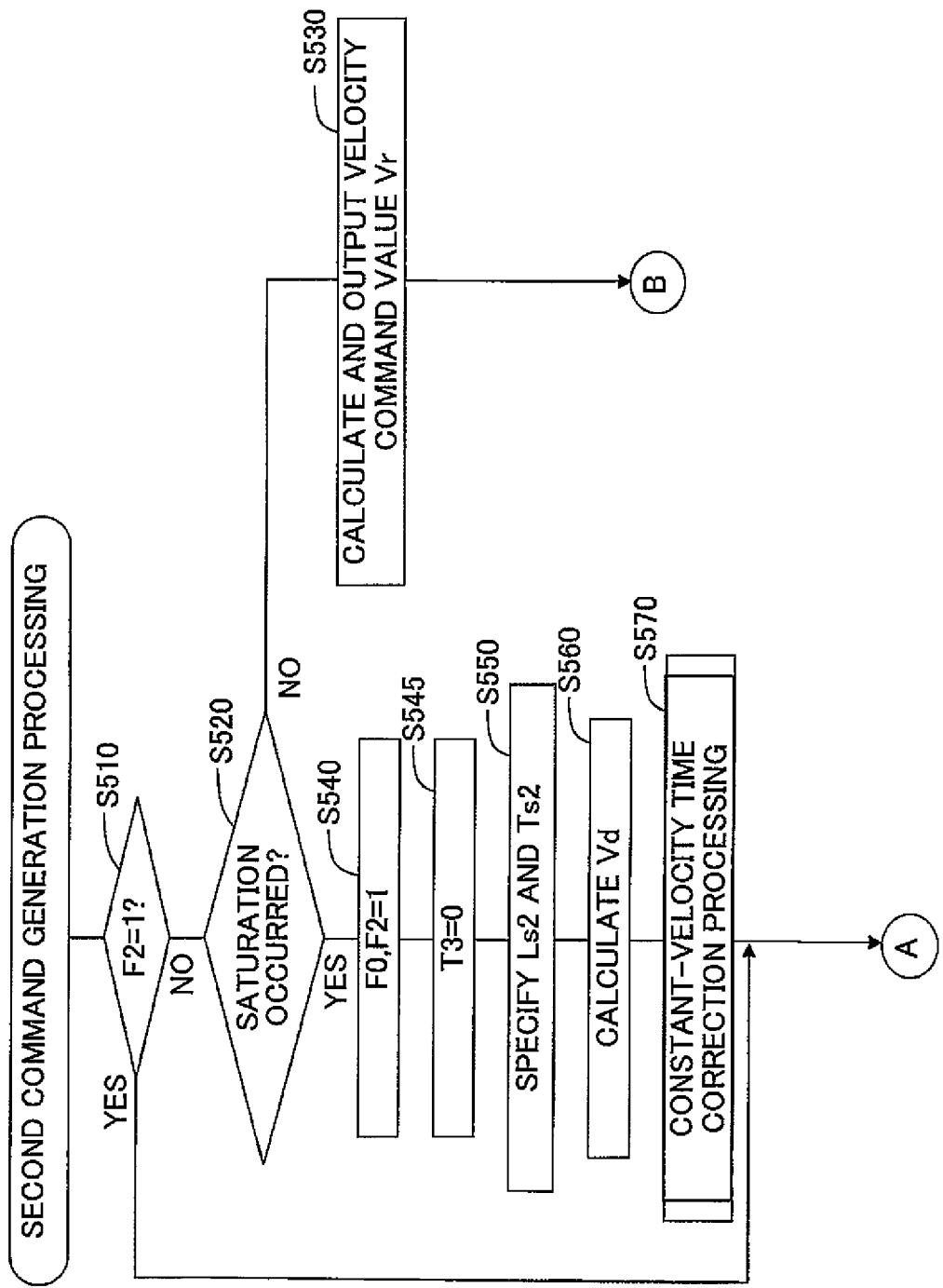
FIGS. 12A and 12B are a flowchart showing a second command generation processing by the command generating section.
Figure 12B:
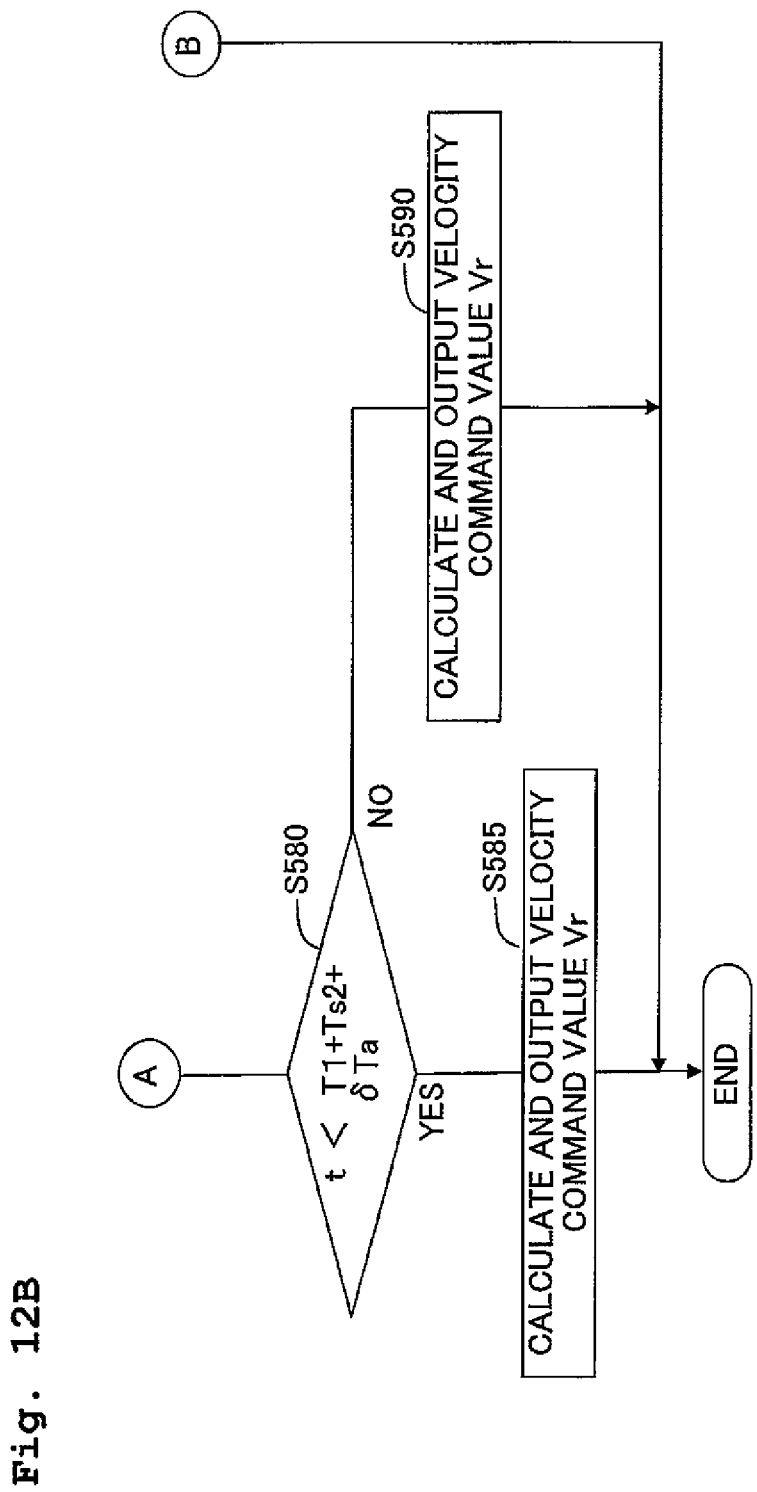

Next, details of the second command generation processing which, the command generating section 535 executes at step S325 will be described below while referring to FIGS. 12A, 12B and FIG. 13. As the second command generation processing is started, the command generating section 535, first of all, makes a judgment of whether or not a value "1" is set for the flag F2. When the command generating section 535 makes a judgment that the value "1" is set for the flag F2 (Yes at S510), the process shifts to step S580. When the command generation section 535 makes a judgment that the value "1" has not been set for the flag F2 (No at S510), the process shifts to step S520.

As the process shifts to step S520, the command generating section 535, similarly as the processing at step S420, makes a judgment of whether or not the electric-current saturation phenomenon has occurred in the LF motor M1. When the command generating section 535 makes a judgment that the electric-current saturation phenomenon has not occurred in the LF motor M1 (No at S520), the process shifts to step S530. At step S530, the command generating section 535 calculates a value Ac·T1 as the velocity command value Vr, based on the control parameters Ac and T1, and outputs the value Ac·T1 which has been calculated. Thereafter, the command generating section 535 terminates the second command generation processing. By this processing, the velocity command value Vr of the constant-velocity control phase [2] as shown in FIG. 7A is input to the controller 533.

Whereas, as the command generating section 535 makes a judgment that the electric-current saturation phenomenon has occurred in the LF motor M1 (Yes at S520), the command generating section 535 shifts the process to step S540, and sets the value "1" for the flag F2 and the flag F0, and furthermore, as one of the processing of correcting the control sequence after the electric-current saturation phenomenon, executes a processing of correcting the control time T3 to zero (S545).

Moreover, after the processing at step S545, the command generating section 535 specifies a transporting amount Ls2 of the paper Q at the point of time of occurrence of the electric-current saturation phenomenon, and a control time Ts2 till the point of time of occurrence of the electric-current saturation phenomenon in the constant-velocity control phase [2] (S550). The transporting amount Ls2 is a transporting amount of the paper Q from a point of time (t=0) of input of a control-start command till the point of time of occurrence of the electric-current saturation phenomenon, and is a length of time from a point of time of start of the constant-velocity phase [2] (t=T1) till the point of time of occurrence of the electric-current saturation phenomenon (t=T1+Ts2) as shown in FIG. 13. At step S550, similarly as the processing at step S450, it is possible to specify an integral value of the velocity command value Vr up to the current point of time (the point of time of occurrence of the electric-current saturation phenomenon) as the transporting amount Ls2.

After the processing at step S550, the command generating section 535, as one of the further processing for correcting the control sequence after the electric-current saturation phenomenon, corrects a target transporting velocity in the constant-velocity control phases [2] and [4] after the occurrence of the electric-current saturation phenomenon, and lowers from the target transporting velocity Va=Ac·T1 in the constant-velocity control phase [2] at the beginning, and the target transporting velocity Vb=Ac·(T1+T3) in the constant-velocity control phase [4] (S560). Concretely, the command generating section 535, based on the control parameter $\delta$Va which has been set by the main control section 51 and the velocity Va of the paper Q at the point of time of occurrence of the electric-current saturation phenomenon, calculates a target transporting velocity Vd after the correction according to the following expression.

$$Vd=Va-\delta Va.$$

Thereafter, the command generating section 535, after having corrected the control time T4 in the constant-velocity control phase [4] (S570) by executing the constant-velocity time correction processing similarly as the processing at step S470, and the process shifts to the step S580.

Figure 13:
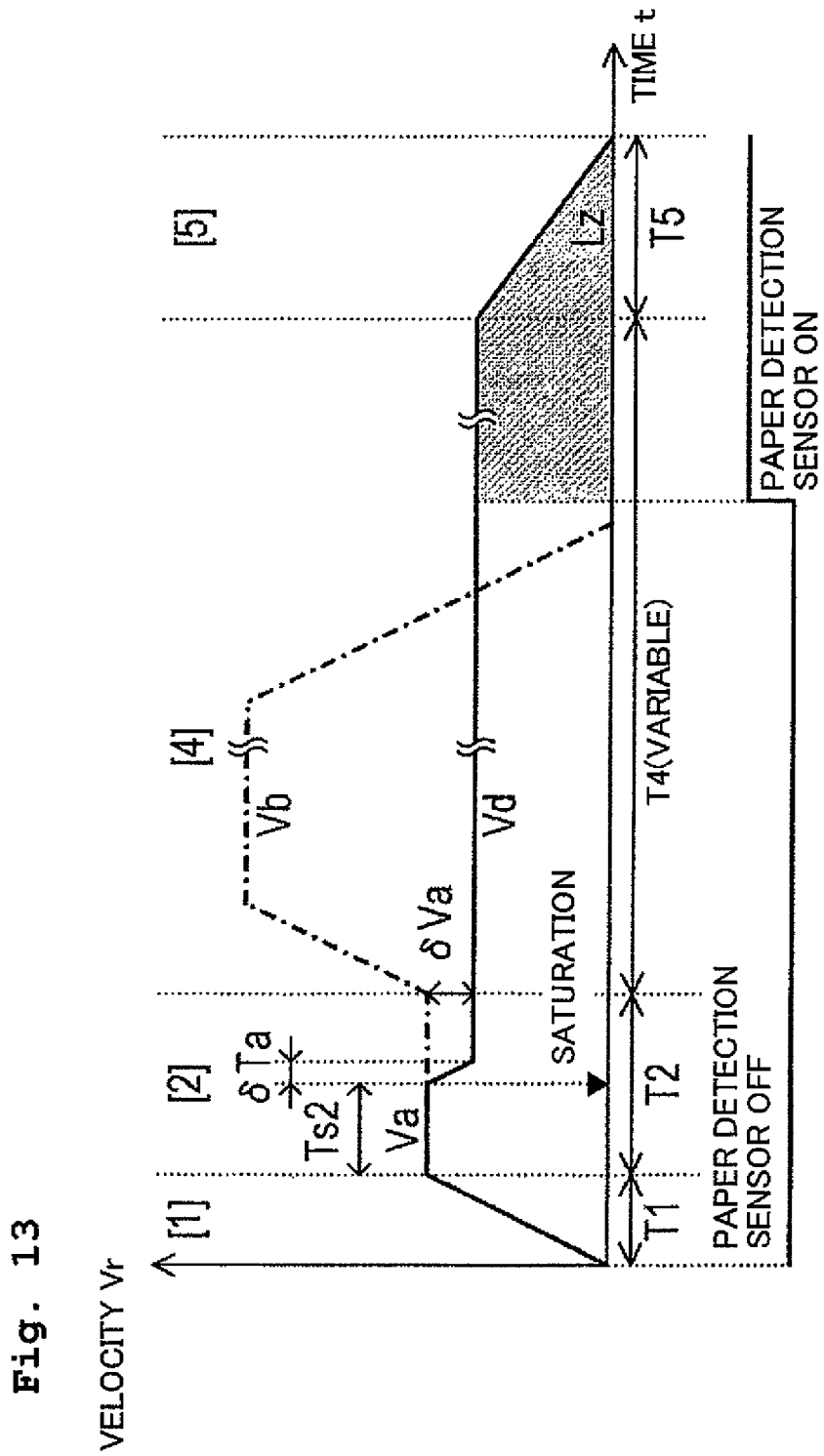
FIG. 13 is a graph showing a trajectory of the velocity command value in a case that the electric-current saturation phenomenon has occurred in a constant-velocity control phase at the time of executing the paper-feed control processing.

Moreover, at step S580, the command generating section 535 makes a judgment of whether or not, the elapsed time t at the current point of time is less than a time (T1+Ts2+$\delta$Ta) where, T1 is a time elapsed after the end of the acceleration control phase [1], Ts2 is a time from the point of time of start of the constant-velocity control phase [2] till the point of time of occurrence of the electric-current saturation phenomenon, and $\delta$Ta is a time of shift indicated by a correction parameter $\delta$Ta (refer to FIG. 13).

Moreover, when the command generating section 535 makes a judgment that the elapsed time t is less than the time (T1+Ts2+$\delta$Ta) (Yes at S580), the process shifts to step S585. At step S585, the command generating section 535 calculates the velocity command value Vr according to the following expression based on the elapsed time t at the current point of time, the correction parameters $\delta$Va and $\delta$Ta, the velocity Va at the point of time of occurrence of the electric-current saturation phenomenon, and the elapsed time t=T1+Ts2, and outputs the velocity command value Vr which has been calculated, to the controller 533.

$$Vr=Va-\delta Va\{t-(T1+Ts2)\}/\delta Ta$$

Thereafter, command generating section 535 terminates the second command generation processing. The correction parameters $\delta$Va and $\delta$Ta are determined experimentally by taking into consideration followability of an object to be driven.

When the electric-current saturation phenomenon occurs in the constant-velocity control phase [2], the processing at steps S580 to S590 is executed repeatedly along with the flag F2 being set to the value "1" at step S540. The command generating section 535, in such manner, by outputting the velocity command value Vr at each time t (elapsed time t) according to the abovementioned expression to the controller 533, in the period till the constant time $\delta$Ta is elapsed after the occurrence of the electric-current saturation phenomenon, lowers down the velocity V of the paper Q to the target transporting velocity Vd, along the trajectory of the velocity command value Vr shown by a solid line in FIG. 13.

Moreover, as the elapsed time t becomes same as or more than (T1+Ts2+$\delta$Ta) (No at S580), the process shifts to step S590, and the command generating section 535 outputs the velocity command value Vr=Vd to the controller 533. In such manner, the command generating section 535, after the occurrence of the electric-current saturation phenomenon, in a period after the constant time (fixed time) $\delta$Ta has elapsed, which is also a period till incoming of an end time t=T1+T2 of the constant-velocity control phase [2], carries out a constant-velocity control of the paper Q at a constant velocity corresponding to the target transporting velocity Vd as shown by the solid line in FIG. 13. In a case in which the electric-current saturation phenomenon has occurred in the constant-velocity control phase [2], since the control time T2 changes to zero, the control sequence after the occurrence of the electric-current saturation phenomenon, skips the acceleration control phase [3] after the end of the constant-velocity control phase [2], and shifts to the constant-velocity control phase [4] of transporting the paper Q at a constant target transporting velocity Vd which is lower than the value at the beginning Vb=Ac·(T1+T3).

Figure 14:
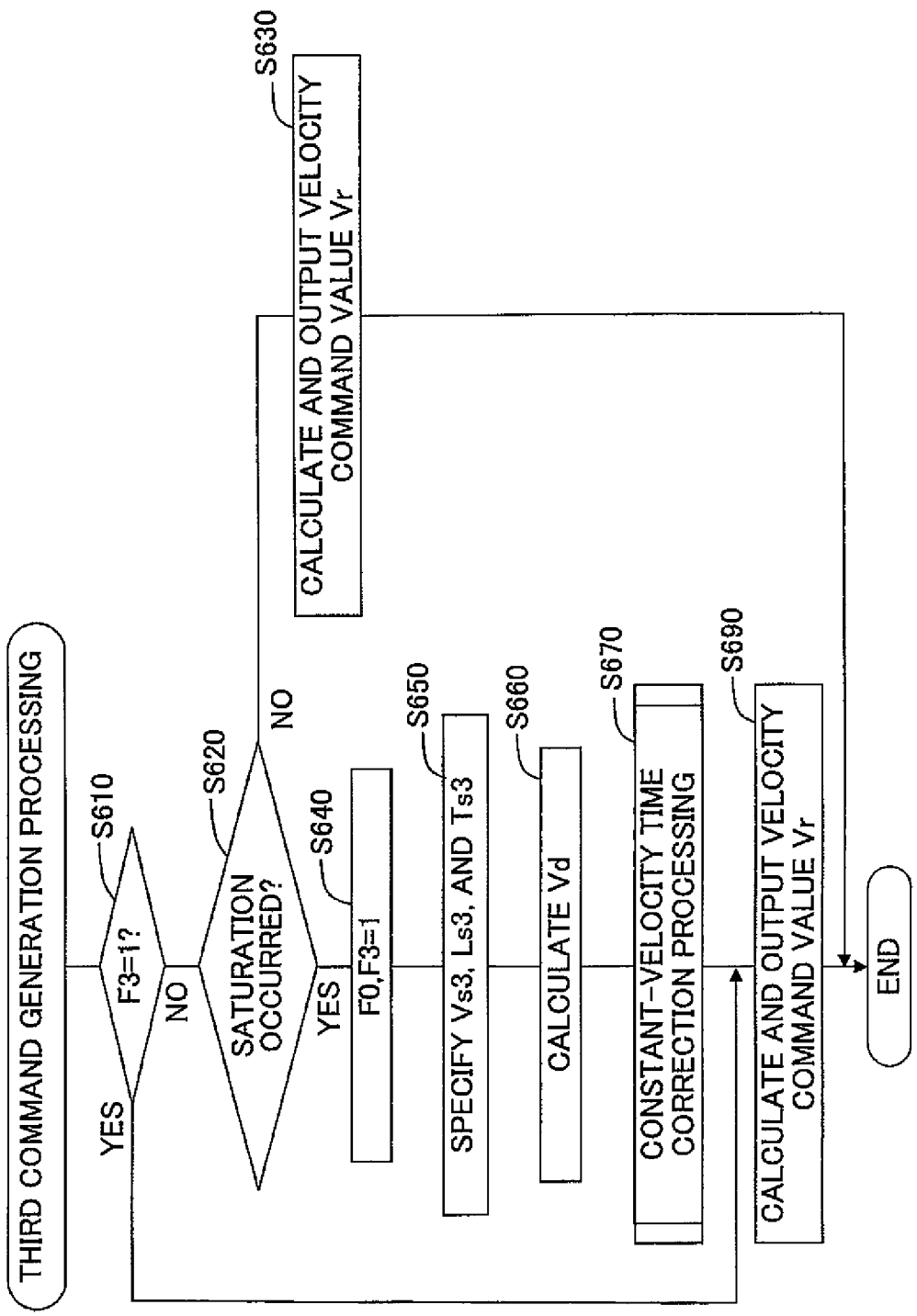
FIG. 14 is a flowchart showing a third command generation processing by the command generating section.
Figure 15:
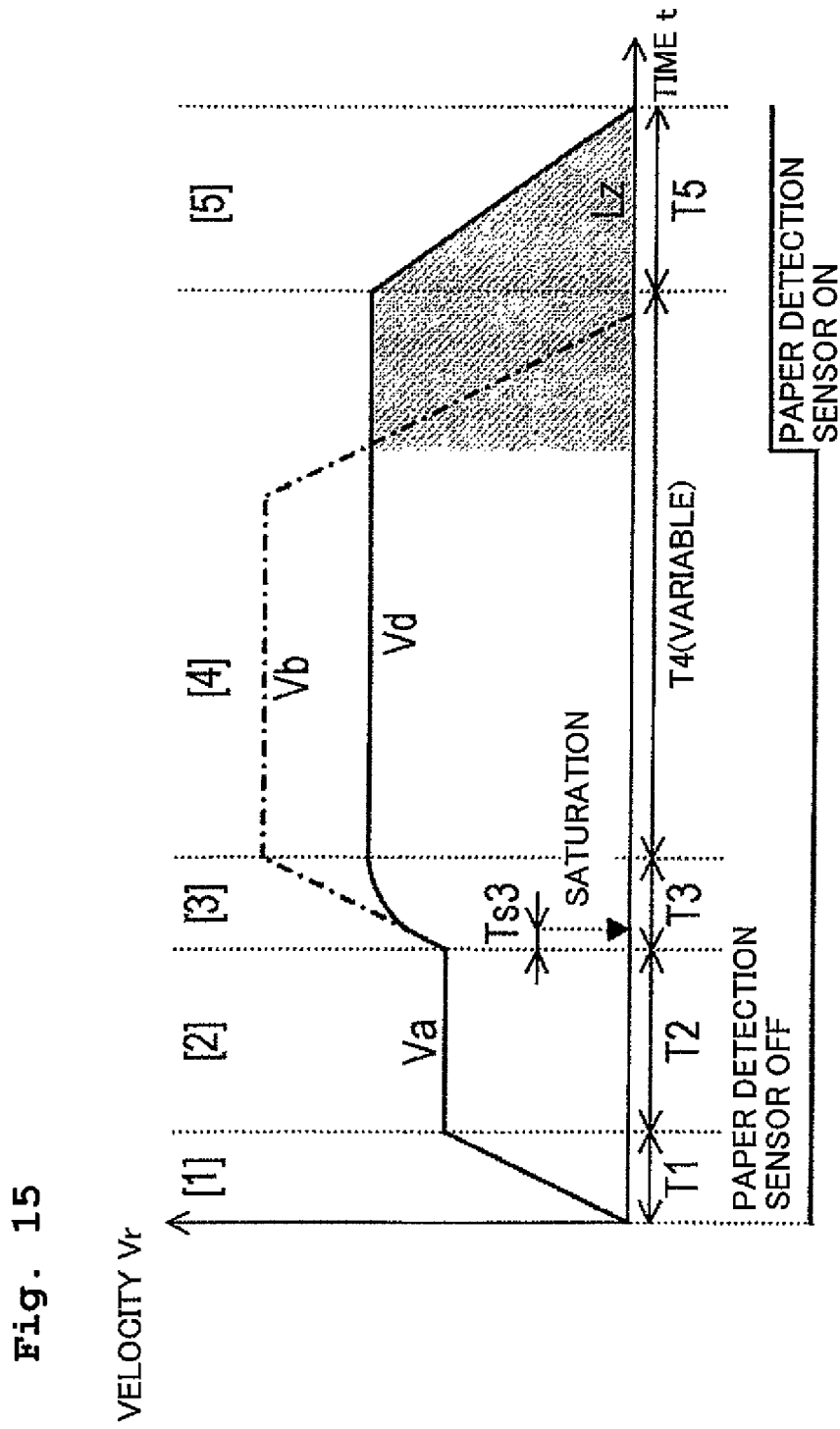
FIG. 15 is a graph showing a trajectory of the velocity command value in a case that the electric-current saturation phenomenon has occurred in the acceleration control phase at the time of executing the paper-feed control processing.

Next, details of the third command generation processing which, the command generating section 535 executes at step S335 will be described below while referring to FIG. 14 and FIG. 15. As the third command generation processing is started, the command generating section 535, first of all, makes a judgment of whether or not a value "1" is set for the flag F3 (S610). When the command generating section 535 makes a judgment that the value "1" has been set for the flag F3 (Yes at S610), the process shifts to S690), and when the command generating section 535 makes a judgment that the value "1" has not been set for the flag F3 (No at S610), the process shifts to step S620.

As the process shifts to step S620, the command generating section 535 makes a judgment of whether or not the electric-current saturation phenomenon has occurred in the LF motor M1. When the command generating section 535 makes a judgment that the electric-current saturation phenomenon has not occurred in the LF motor M1 (No at S620), the process shifts to step S630. At step S630, the command generating section 535 calculates a value Ac·(t+T1) as the velocity command value Vr, based on the control parameters Ac and T1, and the elapsed time t at the current point of time, and outputs the value which has been calculated. Thereafter, the command generating section 535 terminates the third command generation processing. By this processing, the velocity command value Vr of the acceleration control phase as shown in FIG. 7A is input to the controller 533.

Whereas, as the command generating section 535 makes a judgment that the electric-current saturation phenomenon has occurred in the LF motor M1 (Yes at S620), the command generating section sets the value "1" for the flag F3 and the flag F0 (S640). Thereafter, similarly as the processing at steps S450 and S550, the command generating section 535 specifies a transporting amount Ls3 and a velocity Vs3 of the paper Q at the point of occurrence of the electric-current saturation phenomenon, and a control time Ts3 up to the point of time of occurrence of the electric-current saturation phenomenon in the acceleration control phase [3] (S650). The transporting amount Ls3 is a transporting amount of the paper Q from a point of time of input (t=0) of the control-start command up to the point of time of occurrence of the electric-current saturation phenomenon, and the control time T3, as shown in FIG.

15, is a length of time from a point of time of start of the acceleration control phase [3] (t=T1+T2) up to a point of time of occurrence of the electric-current saturation phenomenon (t=T1+T2+Ts3).

After the processing at step S650, the command generating section 535, as one of the processing for correcting the control sequence after the electric-current saturation phenomenon, corrects a target transporting velocity in the constant-velocity control phase [4] after the occurrence of the electric-current saturation phenomenon, and lowers from a value at the beginning Vb=Ac·(T1+T3) (S660). Concretely, the command generating section 535, based on the control parameter Ac·T3, the control time Ts3, and the velocity Vs3 of the paper Q at the point of time of occurrence of the electric-current saturation phenomenon, mentioned above, calculates a target transporting velocity Vd after the correction according to the following expression.

$$Vd = Vs3 + Ac \cdot (T3-Ts3)/3$$

Thereafter, the command generating section 535 executes a constant-velocity time correction processing (which will be described later in detail) (S670), and the process shifts to step S690. Moreover, at step S690, the command generating section 535 calculates a velocity command value Vr at the current point of time (elapsed time t) according to the following expression, as the velocity command value Vr, and inputs the velocity command value Vr which has been calculated, to the controller 533.

$$Vr = Vs3 + Ac \cdot \{t-(T3+T2+T1)\}^3 / \{3 \cdot (Ts3-T3)^2\} Ac \cdot (Ts3-T3)/3$$

Thereafter, the command generating section 535 terminates the third command generation processing. After the occurrence of the electric-current saturation phenomenon, the command generating section 535 executes repeatedly the processing at step S690 till a starting time (t=T1+T2+T3) of the constant-velocity control phase [4] along with the flag F3 being set to the value "1" at step S640, and outputs the velocity command value Vr according to the abovementioned expression at each time (elapsed time t) to the controller 533. Accordingly, as shown in FIG. 15, the paper Q is shifted to a constant-velocity state along a trajectory of the velocity command value Vr lower than the velocity command value Vr=Ac·(t+T1) when the electric-current saturation phenomenon has not occurred, and a trajectory of an acceleration Ac·(t−T3)²/(Ts3−T3)² lower than the acceleration Ac when the electric-current saturation phenomenon has not occurred. Moreover, in the constant-velocity control phase [4], the command generating section 535 carries out constant-velocity transporting of the paper Q with the velocity Vd at the time of end of the acceleration control phase [3] as the target transporting velocity.

Figure 16A:
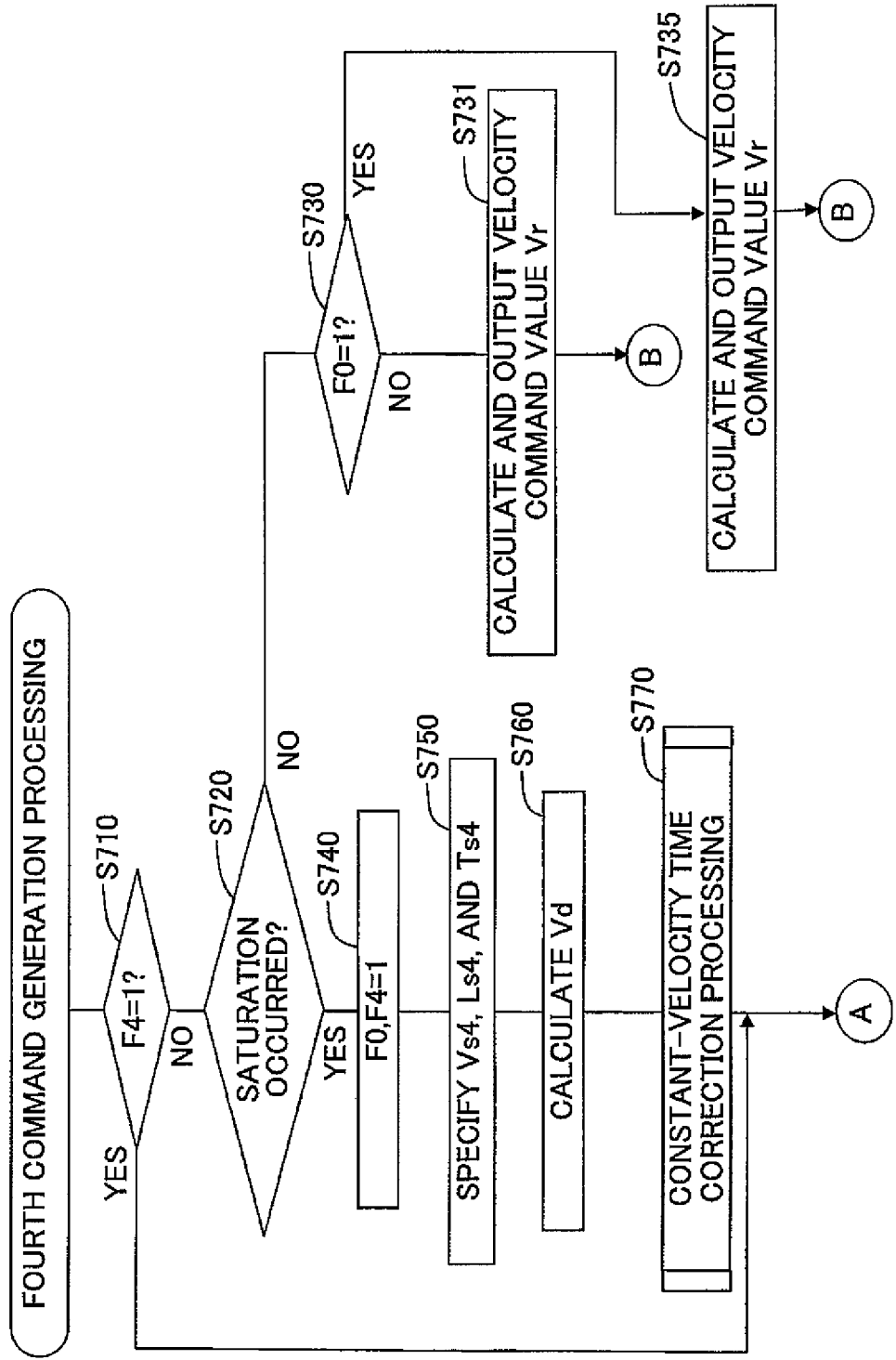
FIGS. 16A and 16B are a flowchart showing a fourth command generation processing by the command generating section.
Figure 16B:
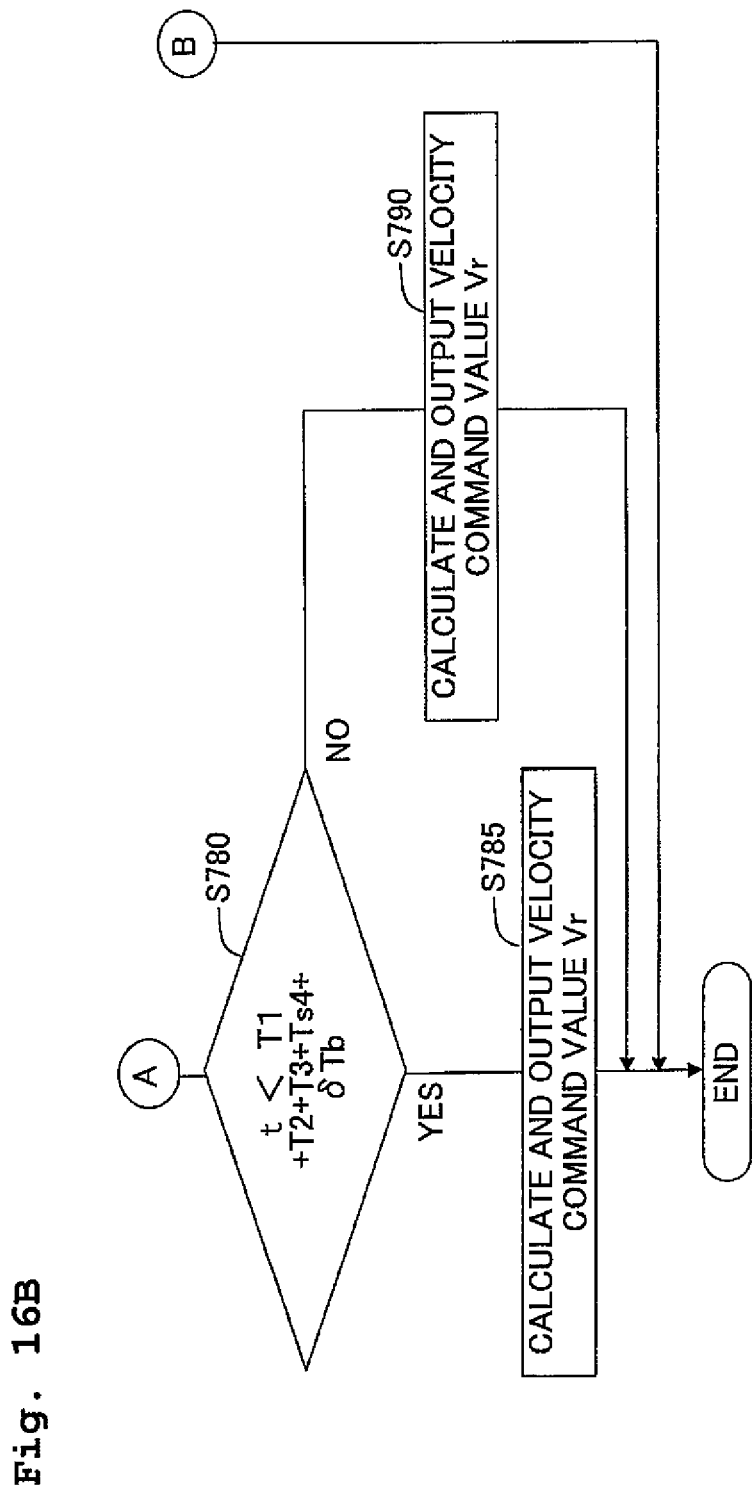

Next, details of the fourth command generation processing which the command generating section 535 executes at step S345 will be described below while referring to FIGS. 16A, 16B and FIG. 17. As the fourth command generation processing is started, the command generating section 535, first of all, makes a judgment of whether or not the value "1" has been set for the flag F4. When the command generating section 535 makes a judgment that the value "1" has been set for the flag F4 (Yes at S710), the process shifts to step S780, whereas, when the command generating section 535 makes a judgment that the value "1" has not been set for the flag F4 (No at S710), the process shifts to step S720.

As the process shifts to step S720, the command generating section 535, similarly as the processing at step S420, makes a judgment of whether or not the electric-current saturation phenomenon has occurred in the LF motor M1. When the command generating section 535 makes a judgment that the electric-current saturation phenomenon has not occurred in the LF motor M1 (No at S720), the process shifts to step S730. As the process shifts to step S730, the command generating section 535 makes a judgment of whether or not the correction of the control sequence due to the occurrence of the electric-current saturation phenomenon in the phases till the current time has been carried out by making a judgment of whether or not the value "1" has been set for the flag F0. When the command generating section 535 makes a judgment that the value "1" has not been set for the flag F0 (No at S730), the command generating section 535 calculates a value Vb=Ac·(T1+T3) as the velocity command value Vr, and outputs the value which has been calculated (S731). Thereafter, the command generating section 535 terminates the fourth command generation processing. By this processing, the velocity command value Vr of the constant-velocity control phase [4] as shown in FIG. 7A is input to the controller 533. Whereas, when the command generating section 535 makes a judgment that the value "1" has been set for the flag F0 (Yes at S730), the command generating section 535 outputs the value Vd which has been calculated at any of the steps S460, S560, and S660 as the velocity command value Vr (S735). Thereafter, the command generating section terminates the fourth command generation processing. By this processing, the velocity command value Vr of the constant-velocity control phase as shown in FIG. 10, FIG. 13, and FIG. 15 is input to the controller 533.

Whereas, when the command generating section 535 makes a judgment that the electric-current saturation phenomenon has occurred in the LF motor M1 (Yes at S720), the command generating section 535 sets the value "1" for the flag F4 and the flag F0 (S740). Furthermore, the command generating section 535 specifies a velocity Vs4 and a transporting amount Ls4 of the paper Q at the point of time of occurrence of the electric-current saturation phenomenon, and a control time Ts4 till the point of time of occurrence of the electric-current saturation phenomenon in the constant-velocity control phase [4] (S750). The velocity Vs4 is either the velocity Vb or the velocity Vd, and the transporting amount Ls4 is a transporting amount of the paper Q from a point of time of start (t=0) of the control-start command up to the point of time of occurrence of the electric-current saturation phenomenon, and the control time Ts4, as shown in FIG. 17, is a length of time from a point of time of start (t=T1+T2+T3) of the constant-velocity control phase [4] up to the point of time of occurrence of the electric-current saturation phenomenon (t=T1+T2+T3+Ts4).

After the processing at step S750, the command generating section 535, as one of the processing for correcting the control sequence after the occurrence of the electric-current saturation phenomenon, lowers a target transporting velocity in the constant-velocity control phase [4] after the occurrence of the electric-current saturation phenomenon (S760). Concretely, the command generating section 535, based on the velocity Vs4 of the paper Q at the point of time of occurrence of the electric-current saturation phenomenon, and the control parameter δVb which has been set by the main control section 51, calculates the target transporting velocity Vd after the correction, according to the following expression.

$$Vd = Vs4 - \delta Vb.$$

Thereafter, after the command generating section 535 has corrected the control time T4 in the constant-velocity control phase [4] by executing a constant-velocity time correction processing similar to the processing at step S470, the process shifts to step S780.

Figure 17:
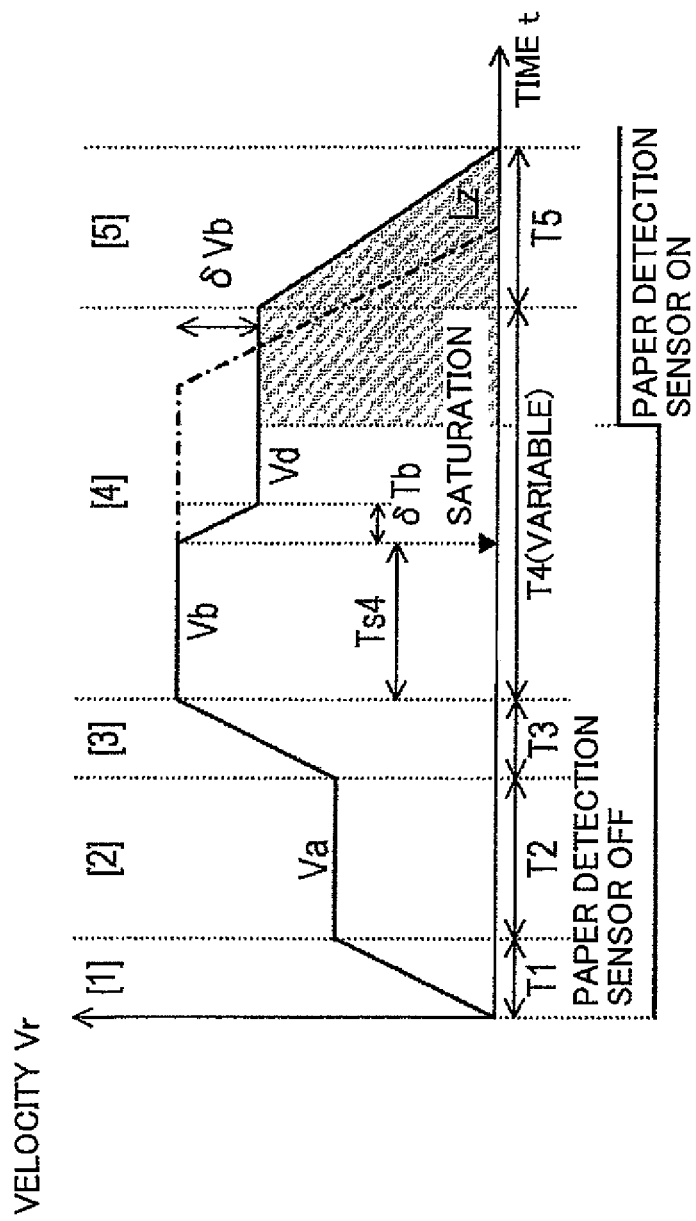
FIG. 17 is a graph showing a trajectory of the velocity command value in a case that the electric-current saturation phenomenon has occurred in the constant-velocity control phase at the time of executing the paper-feed control processing.

At step S780, the command generating section 535 makes a judgment of whether or not the elapsed time t at the current point of time is less than a time (T1+T2+T3+Ts4+δTb) which is a combined value of a time elapsed T1+T2+T3 at a point of time of start of the constant-velocity control phase, the time Ts4 from the point of time of start of the constant-velocity control phase [4] up to the point of time of occurrence of the electric-current saturation phenomenon, and a shifting time δTb which is expressed by a correction parameter δTb (refer to FIG. 17).

When the command generating section 535 makes a judgment that the elapsed time t at the current point of time is smaller than the time (T1+T2+T3+Ts4+δTb) (Yes at S780), the process shifts to step S785. At step S785, the command generating section 535, based on the elapsed time t at the current point of time, the correction parameters δVb and δTb, the velocity Vs4 at the point of time of occurrence of the electric-current saturation phenomenon, and a time elapsed t=T1+T2+T3+Ts4, calculates the velocity command value Vr according to the following expression, and outputs the velocity command value Vr which has been calculated, to the controller 533.

$$Vr=Vs4-\delta Vb\{t-(T1+T2+T3+Ts4)\}/\delta Tb$$

Thereafter, the command generating section 535 terminates the fourth command generation processing.

The command generating section 535 carries out repeatedly the processing from steps S780 to S790 along with the value "1" being set for flag F4 at step S740 after the occurrence of the electric-current saturation phenomenon. Accordingly, the command generating section 535, during a period till the constant time δTb has elapsed, outputs the velocity command value Vr according to the abovementioned expression at each time (elapsed time t) to the controller 533, and lowers down the velocity of the paper Q to a target transporting velocity Vd after the correction, along a trajectory of the velocity command value Vr indicated by a solid line in FIG. 17.

Moreover, as the elapsed time t becomes same as or more than the time (T1+T2+T3+Ts4+δTb) (No at S780), the process shifts to step S790. At step S790, the command generating section 535 outputs the velocity command value Vr=Vd based on the value Vd calculated at step S760, to the controller 533. Accordingly, the command generating section 535, after the occurrence of the electric-current saturation phenomenon, in a period after the constant time δTb has elapsed, which is also a period till incoming of an end time t=T1+T2+T3+T4 of the constant-velocity control phase [4], transports the paper Q at a constant velocity corresponding to the target transporting velocity Vd after the correction indicated by the solid line in FIG. 17. Moreover, with the advent of the end time t=T1+T2+T3+T4 of the constant-velocity control phase [4], the command generating section 535, by executing the fifth command generation processing (S355), controls the LF motor M1 such that the transporting velocity of the paper Q decreases till becoming zero, and the transporting paper Q stops at a point (target position) corresponding to a target transporting amount Le.

The content of the fourth command generation processing has been described above. The correction parameters δVb and δTb used in the fourth command generation processing and the control parameters δVa and δTa used in the second command generation processing may be set to be the same values, or may be set to be different values. When the correction parameters δVb and δTb are set independently of the correction parameters δVa and δTa, it is possible to correct the target transporting velocity by using an appropriate correction parameter according to the transporting position of the paper Q, and to transport the paper at a high velocity while suppressing accurately a recurrence of the electric-current saturation phenomenon.

Figure 18:
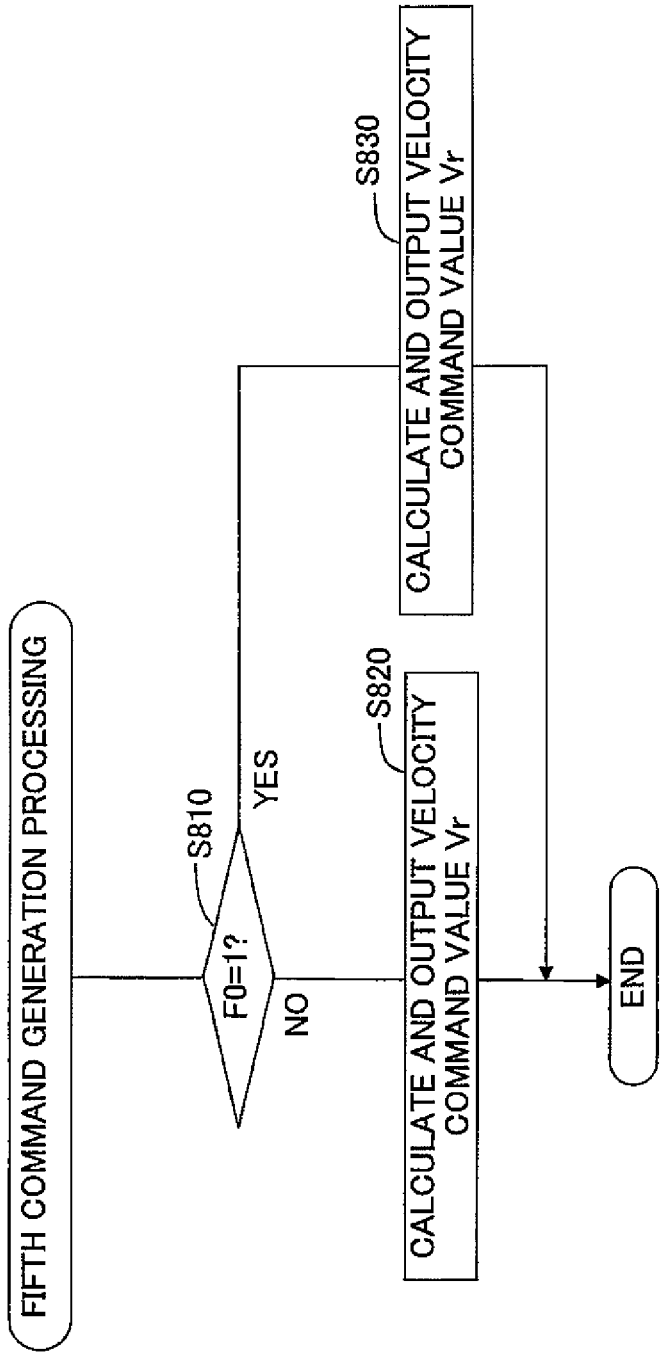
FIG. 18 is a flowchart showing a fifth command generation processing by the command generating section.
Figure 19:
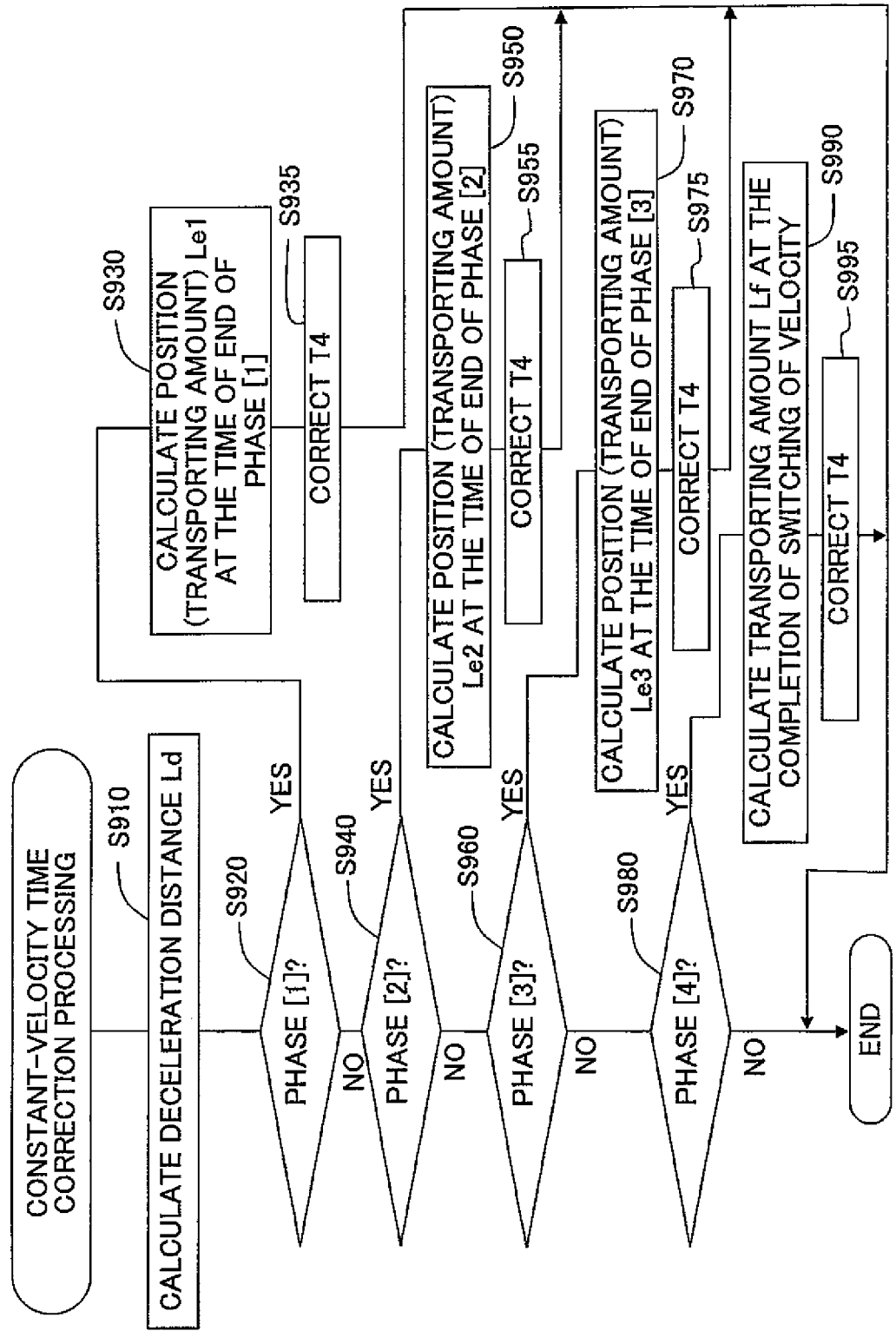
FIG. 19 is a flowchart showing a constant-velocity time correction processing by the command generating section.

Next, details of the fifth command generation processing which, the command generating section 535 executes at step S355 will be described below while referring to FIG. 18. As the fifth command generation processing is started, the command generating section 535, first of all, makes a judgment of whether or not the value "1" has been set for the flag F0. When the command generating section 535 makes a judgment that the value "1" has not been set for the flag F0 (No at S810), the process shifts to step S820, whereas, when the command generating section 535 makes a judgment that the value "1" has been set for the flag F0 (Yes at S810), the process shifts to step S830.

At step S820, the command generating section 535, based on an elapsed time t at the current point of time, a velocity Vb and a time t=T1+T2+T3+T4 elapsed at a point of time of start of the deceleration control phase [5], and a control time T5, calculates a velocity command value Vr according to the following expression, and outputs the velocity command value Vr which has been calculated, to the controller 533.

$$Vr=Vb-Vb\{t-(T1+T2+T3+T4)\}/T5$$

Thereafter, the command generating section 535 terminates the fifth command generation processing.

Whereas, when the process shifts to step S830, the command generating section 535 calculates a velocity command value Vr according to the following expression, based on the velocity Vd at the point of time of start of the deceleration control phase [5], and outputs the velocity command value Vr which has been calculated, to the controller 533.

$$Vr=Vd-Vd\{t-(T1+T2+T3+T4)\}/T5$$

Thereafter, the command generating section 535 terminates the fifth command generation processing.

In such manner, in a case in which the electric-current saturation phenomenon has not occurred till a point of time of end of the constant-velocity control phase [4], the command generating section 535 controls the LF motor M1 to decelerate the paper Q from the target transporting velocity in the constant-velocity control phase [4] to the velocity zero in time T5 as shown in FIG. 7A, and in a case in which the electric-current saturation phenomenon has occurred till the point of time of end of the constant-velocity control phase [4], the command generating section 535 controls the LF motor M1 to decelerate the paper Q from the target transporting velocity Vb in the constant-velocity control phase [4] to the velocity zero in time T5 as shown in FIG. 10, FIG. 13, FIG. 15, and FIG. 17.

Moreover, for suppressing the occurrence of the electric-current saturation phenomenon, only by lowering the velocity command value Vr from the value at the beginning, it is not possible to stop the paper Q at the point (target position) corresponding to the target transporting amount Le. Therefore, as mentioned heretofore, in a case in which the electric-current saturation phenomenon has occurred, by executing the constant-velocity time correction processing at steps S470, S570, S670, and S770, the command generating section 535 corrects the control time T4 such that the paper Q stops at the point corresponding to the target transporting amount Le.

As a constant-velocity time correction processing starts, the command generating section 535, based on the control time T5 and the target transporting velocity Vd which has been calculated (or corrected) at this point of time, calculates a deceleration distance Ld=Vd·T5/2 which is a transporting amount of the paper Q in the deceleration control phase [5] (S910).

Moreover, the command generating section 535 makes a judgment of whether or not the current phase is the acceleration control phase [1] (S920). When the command generating section 535 makes a judgment that the current phase is the acceleration control phase [1] (Yes at S920), the command generating section 535 calculates a transporting amount Le1 at a point of time of end of the acceleration control phase [1] according to the following expression (S930).

$$Le1=Ls1+Ac\cdot(Ts1-T1)^2/4-Vs1\cdot(Ts1-T1)$$

Moreover, after having corrected the control time T4 according to the following expression, based on the transporting amount Le1, the target transporting amount Le, and the target transporting velocity Vd in the constant-velocity control phase [4] in continuity with the acceleration control phase [1], the command generating section terminates the constant-velocity time correction processing.

$$T4=(Le-Le1-Ld)/Vd.$$

Whereas, when the command generating section 535 makes a judgment that the current phase is the constant-velocity control phase [2] (No at S920 and Yes at S940), the command generating section 535 shifts the process to step S950, and calculates a transporting amount Le2 at a point of time of end of the constant-velocity control phase [2] according to the following expression.

$$Le2=Ls2+Va\cdot\delta Ta-\delta Va\cdot\delta Ta/2+Vd\cdot\{T2-(Ts2+\delta Ta)\}$$

moreover, based on the transporting amount Le, the command generating section 535 calculates the control time T4=(Le−Le2−Ld)/Vd after the correction, and after setting the value which has been calculated (S955), to the control time T4, the command generating section 535 terminates the constant-velocity time correction processing.

When the command generating section 535 makes a judgment that the current phase is the acceleration control phase [3] (No at S920 and S940, and Yes at S960), the command generating section 535 shifts the process to step S970, and calculates a transporting amount Le3 at a point of time of end of the constant-velocity control phase [3] according to the following expression.

$$Le3=Ls3+Ac\cdot(Ts3-T3)^2/4-Vs3\cdot(Ts3-T3)$$

Moreover, based on the transporting amount Le3 which has been calculated, the command generating section 535 calculates a control time T4=(Le−Le3−Ld) after the correction, and after setting the value which has been calculated, to the control time T4 (S975), terminates the constant-velocity time correction processing.

Moreover, when the command generating section makes a judgment that the current phase is the constant-velocity control phase [4] (No at S920, S940, and S960, and Yes at S980), the process shifts to step S990. At step S990, the command generating section 535 calculates a transporting amount Lf of the paper Q at a point of time at which, the elapsed time t has been judged to be same as or more than the time (T1+T2+T3+Ts4+δTb) in the fourth command generation processing at step S780, according to the following expression.

$$Lf=Ls4+Vs4\cdot\delta Tb-\delta Vb\cdot\delta Tb/2$$

Moreover, based on the transporting amount Lf, the deceleration distance Ld, the target transporting amount Le, the correction parameter δTb, the execution time Ts4, and the target transporting velocity Vd after the correction at step S760, the command generating section calculates the control time T4 after the correction according to the following expression.

$$T4=Ts4+\delta Tb+(Le-Lf-Ld)/Vd.$$

After setting the value which has been calculated, to the control time T4 (S995), the command generating section 535 terminates the constant-velocity time correction processing. In the first embodiment, by executing such processing of correcting the control time T4 as a processing for correcting the control sequence after the occurrence of the electric-current saturation phenomenon, it is possible to stop the paper Q at a point corresponding to the target transporting amount Le.

Next, a detection-time correction processing which, the command generating section 535 executes parallel to a paper-feed control processing, after a control-start command has been input from the main control section 51, will be described below while referring to FIG. 20. The command generating section 535 corrects the control time T4 in the constant-velocity control phase [4] based on an output signal from the paper detection sensor SN, by executing the detection-time correction processing shown in FIG. 20. Accordingly, it is possible to stop the paper Q with high accuracy at a point corresponding to the target transporting amount Le. A detection state of the paper detection sensor, when driven according to the control sequence which has been corrected is shown in FIG. 10, FIG. 13, FIG. 15, and FIG. 17.

Figure 20:
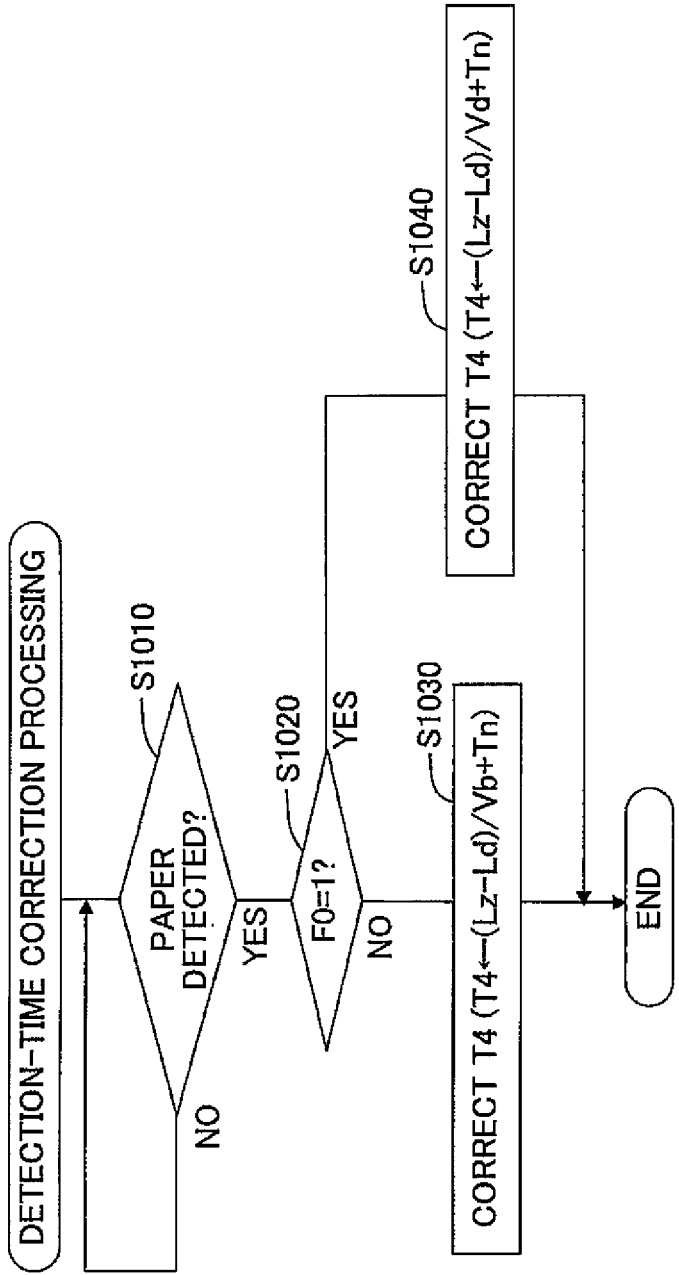
FIG. 20 is a flowchart showing a detection-time correction processing by the command generating section.

As the detection-time correction processing starts as shown in FIG. 20, the command generating section 535 monitors an output signal of the paper detection sensor SN till the output signal of the paper detection sensor SN is switched from an OFF signal to an ON signal (S 1010). Moreover, as the output signal of the paper detection sensor SN is switched to the ON signal (Yes at S1010), the command generating section 535 makes a judgment of whether or not the value "1" has been set for the flag F0 (S1020). Here, when the command generating section 535 makes a judgment that the value "1" has not been set for the flag F0 (No at S1020), the process shifts to step S1030. At step S1030, the command generating section 535 calculates a control time T4 after the correction according to the following expression.

$$T4=Tn+(Lz-Ld)/Vb.$$

Moreover, after setting the value which has been calculated, to the control time T4, the command generating section 535 terminates the detection-time correction processing. A velocity Vb in the abovementioned expression is the velocity command value Vr in the constant-velocity control phase [4], and a distance Lz is a transporting amount (distance) of the paper Q which is necessary for transporting the paper Q from a point of detection of the paper Q by the paper detection sensor SN up to a point corresponding to the target transporting amount Le, a distance Ld is a deceleration distance which is calculated by a method similar to the processing at step S910 in the constant-velocity time correction processing, and a time Tn is a length of time from a point of time of start (t=T1+T2+T3) of the constant-velocity control phase [4] up to a point of time (t=T1+T2+T3+Tn) at which the output signal of the paper detection sensor SN is switched to the ON signal. The distance Lz is set in the paper-feed control section 53 from the main control section 51, together with the target transporting amount Le, and is stored in advance in a register etc.

Whereas, when the command generating section 535 makes a judgment that the value "1" has been set for the flag F0 (Yes at S1020), the command generating section 535 shifts the process to step S1040, and calculates the control time T4 after the correction according to the following expression.

$$T4=Tn+(Lz-Ld)/Vd$$

Moreover, after setting the value which has been calculated, to the control time T4, the command generating section 535 terminates the detection-time correction processing. A velocity Vd in the abovementioned expression is the velocity command value Vr after the correction in the constant-velocity control phase [4], and the remaining values Lz, Ld, and Tn are similar as in the processing at step S1030.

In the detection-time correction processing, it is possible to stop the paper Q at the point corresponding to the target transporting amount Le with even higher accuracy by correcting the control time T4 with passing of the front end of the paper Q the detection point for the paper Q by the paper detection sensor SN acting as the impetus for the correction, in such manner. In the first embodiment, since the control time T4 is corrected at the point of time at which, the output signal of the paper detection sensor SN has been switched to the ON signal in such manner, even in a case in which the electric-current saturation phenomenon has occurred and the velocity command value Vr has been lowered, it is possible to transport the paper Q by the amount equivalent to the target transporting amount Le by the detection-time correction processing. However, according to a mode of occurrence of the electric-current saturation phenomenon, as shown in FIG. 10, FIG. 13, and FIG. 15, without the correction by the constant-velocity time correction processing, sometimes, the front end of the paper Q does not reach the detection point by the paper detection sensor SN till the constant-velocity control phase [4] ends. In the first embodiment, by executing both the constant-velocity time correction processing and the detection-time correction processing, it is possible to transport the paper Q up to the point corresponding to the target transporting amount Le, and to stop accurately even when the electric-current saturation phenomenon occurs.

Figure 21:
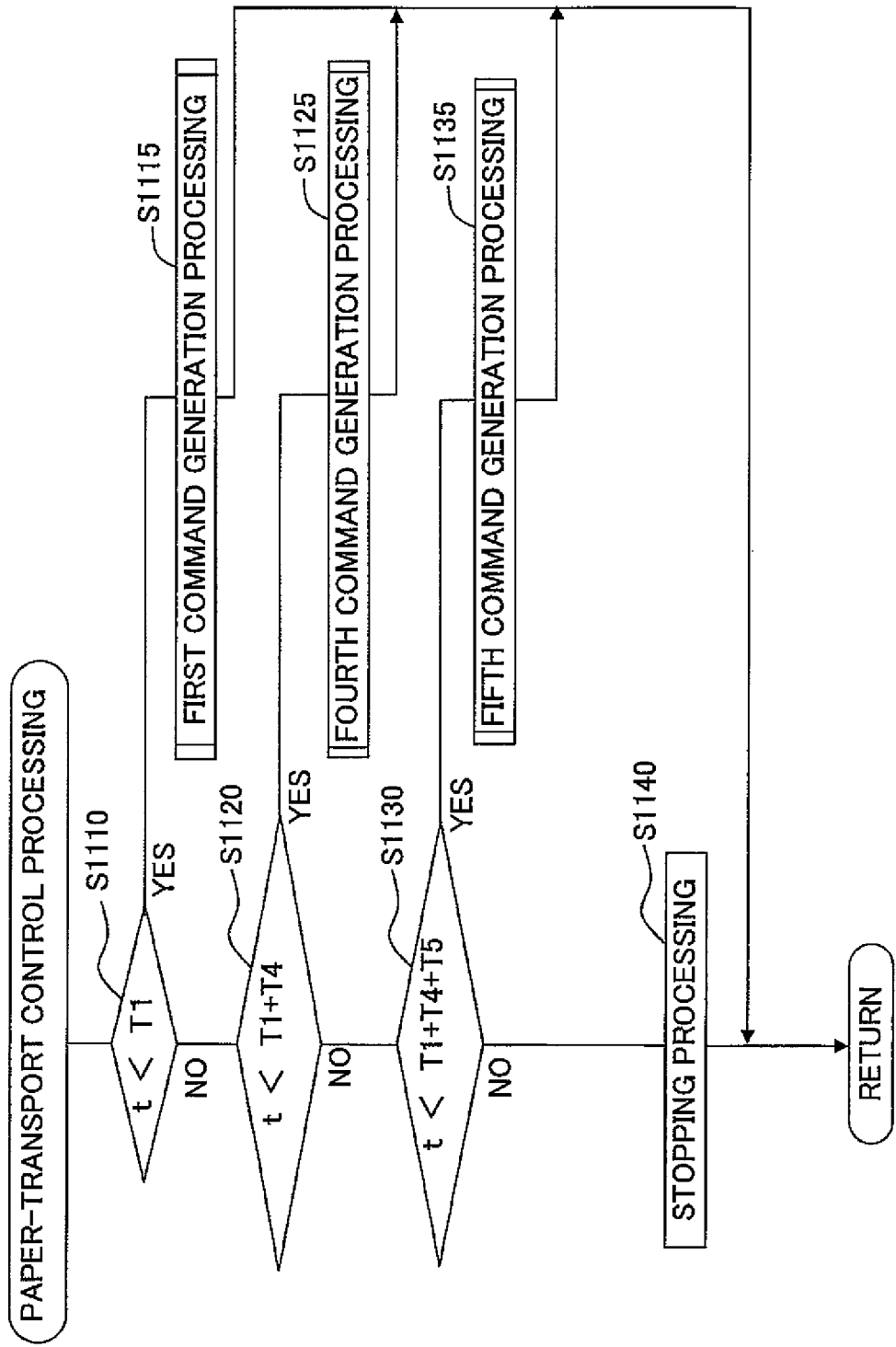
FIG. 21 is a flowchart showing the paper-transport control processing by the command generating section.

The details of the control by the paper-feed control section 53 have been described heretofore. Even the paper-transport control section 55 controls the LF motor M1 by a method almost similar to the method of control by the paper-feed control section 53. In other words, as a control-start command is input from the main control section 51, the command generating section 555 executes a paper-transport control processing shown in FIG. 21 repeatedly according to a control cycle. As it is evident from FIG. 21, the paper-transport control processing is basically the same as the paper-feed control processing when the control time T2 and T3 are zero.

As the command generating section 55 starts the paper-transport control processing, the command generating section 55 makes a judgment of whether or not the current phase is the acceleration control phase [1] by making a judgment of whether or not an elapsed time t from a point of time of start of control of the LF motor M1 based on the control-start command is less than a control time T1 (S1110). When the command generating section 555 makes a judgment that the current phase is the acceleration control phase [1], the command generating section 555 executes a first command generation processing indicated in FIG. 9 of computing the velocity command value Vr corresponding to the acceleration control phase [1], and outputting the value which has been computed (S1115). Thereafter, the command generating section 555 terminates the paper-transport control processing temporarily till incoming of the subsequent control cycle.

Whereas, when the command generating section 555 makes a judgment that the current phase is not the acceleration control phase [1], the process shifts to step S1120. At step S1120, the command generating section 555 makes a judgment of whether or not the current phase is the constant-velocity control phase [4] which is in continuity with the acceleration control phase [1], by making a judgment of whether or not the elapsed time t is less than a time T1+T4. Moreover, when the command generating section 555 makes a judgment that the current phase is the constant-velocity control phase [4], the command generating section 555, the command generating section 555 executes the fourth command generation processing shown in FIGS. 16A and 16B of the velocity command value Vr corresponding to the constant-velocity control phase [4], and outputting the velocity command value Vr which has been computed (S1125). Thereafter, the command generating section 555 terminates the paper-transport control processing temporarily till incoming of the subsequent control cycle.

Moreover, the command generating section 555 makes a judgment that the current phase is not the constant-velocity control phase [4] at step S1120, the process shifts to step S1130. At step S1130, the command generating section 555 makes a judgment of whether or not the current phase is the deceleration control phase [5] by making a judgment of whether or not the elapsed time t is less than a time T1+T4+T5. Moreover, as the command generating section 555 makes a judgment that the current phase is the deceleration control phase [5] (Yes at S1130), the command generating section executes the fifth command generation processing shown in FIG. 18, of computing the velocity command value Vr corresponding to the deceleration control phase [5], and outputting the velocity command value Vr which has been computed (S1135). Thereafter, the command generating section 555 terminates the paper-transport control processing temporarily till incoming of the subsequent control cycle.

As the command generating section 555 makes a judgment that the current phase is not the deceleration control phase [5] at step S1130, the process shifts to step S1140. At step 1140, the command generating section 555 executes a stopping processing of outputting a value "0" as the velocity command value Vr and a constant time. Thereafter, the command generating section 555 terminates a repeated operation of the series of paper-transport control processing. In such manner, the command generating section 555 computes the velocity command value Vr corresponding to each phase, and inputs the velocity command value Vr which has been computed, to the controller 553.

To explain concretely, in a case in which the electric-current saturation phenomenon has not occurred, the command generating section 555 inputs the velocity command value Vr corresponding to the trajectory indicated in FIG. 7B, to the controller 553. In a case in which the electric-current saturation phenomenon has occurred in the acceleration control phase [1], the command generating section 555 inputs the velocity command value Vr corresponding to the trajectory indicated by the solid line in FIG. 10, to the controller 553. In a case in which the electric-current saturation phenomenon has occurred in the constant-velocity control phase [4], the command generating section 555 inputs the velocity command value Vr corresponding to a trajectory indicated by a solid line in FIG. 22, to the controller 553. Moreover, in a case in which the electric-current saturation phenomenon has occurred, the command generating section 555 corrects the control time T4.

The image forming apparatus 1 according to the first embodiment has been described heretofore. According to the first embodiment, by using the abovementioned method, it is possible to stop the paper Q with high accuracy at the point corresponding to the target transporting amount Le while suppressing the occurrence of the electric-current saturation phenomenon.

It is possible to set a value smaller than the correction parameters δVa and δVb to be set in the paper-feed control section 53, as the correction parameter δVb for (in) the paper-transport control section 55. When δVb is made large, the time taken till the paper Q is transported to the point (target point) corresponding to the target transporting amount becomes long as a result of making the δVb long, but a load acting on the paper Q at the time of executing the paper-transporting process being smaller as compared to the load at the time of executing the paper-feeding process, a possibility that the electric-current saturation phenomenon occurs is lower than a possibility that the electric-current saturation phenomenon occurs in the paper feeding process. Consequently, when the correction parameter δVb for the paper-transport control section 55 is made smaller than the correction parameter δVa for the paper-feed control section 55, it is possible to transport the paper Q to a point which is a target point, at a high velocity while suppressing the recurrence of the electric-current saturation phenomenon.

Second Embodiment

Figure 23:
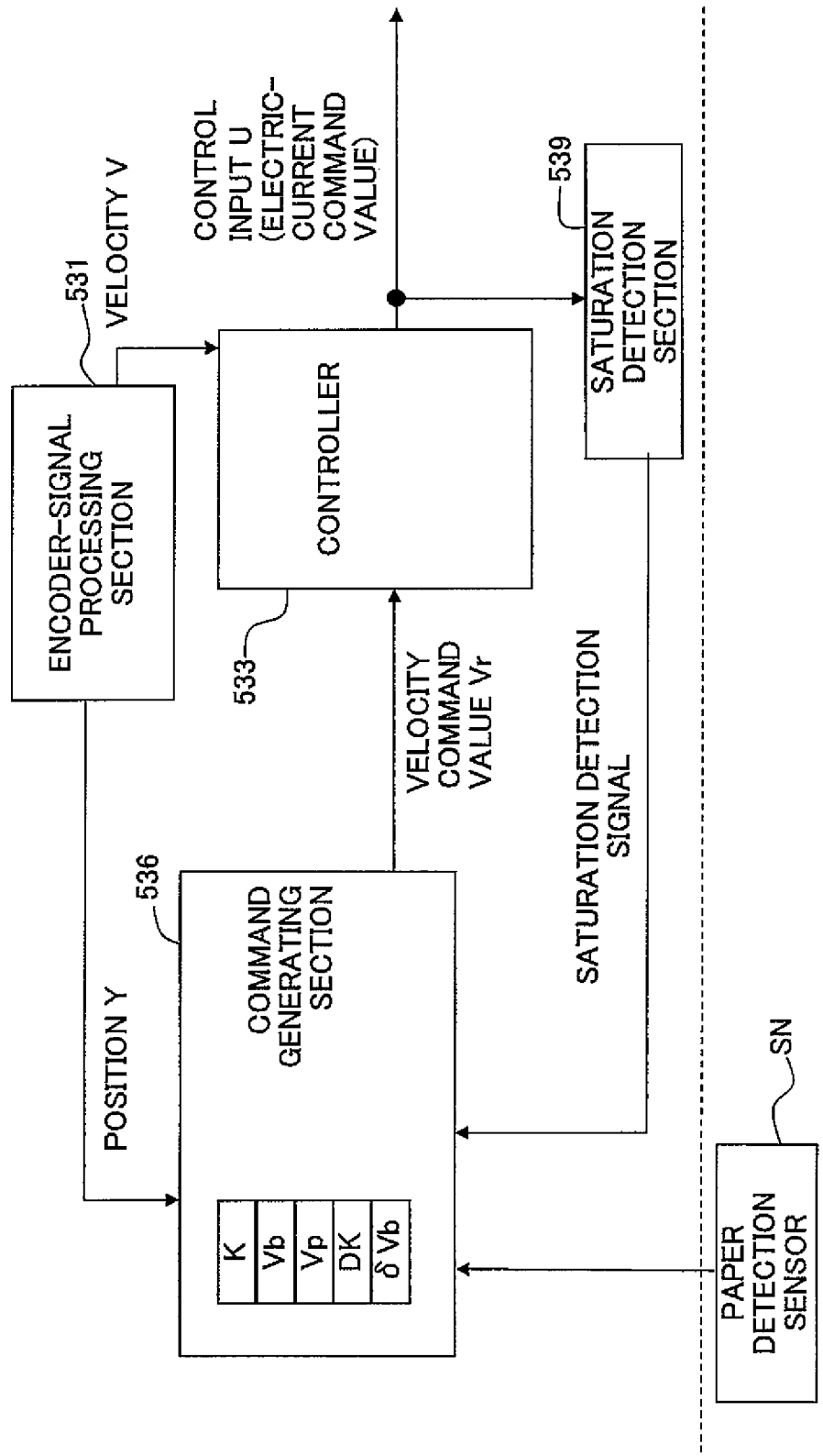
FIG. 23 is a block diagram showing a configuration of the paper-feed control section in a second embodiment.

Next, an image forming apparatus 1 according to a second embodiment of the present invention will be described below. However, the image forming apparatus 1 according to the second embodiment is almost same as the image forming apparatus 1 according to the first embodiment except for a point that, the paper detection sensor SN is installed at an upstream side in the paper transporting direction of the paper detection sensor SN in the first embodiment, a point that a paper-feed control section 53 has a configuration as shown in FIG. 23, and outputs the velocity command value Vr following a trajectory shown in FIG. 24, and a point that a command generating section 536 executes a paper-feed control processing shown in FIGS. 25A and 25B. Therefore, an arrangement in the image forming apparatus 1 which differs from the first embodiment will be mentioned below selectively as the description of the second embodiment.

The paper-feed control section 53 according to the second embodiment, as shown in FIG. 23, includes the command generating section 536 instead of the command generating section 535 in the first embodiment. The command generating section 536 outputs a velocity command value Vr corresponding to a transporting position Y, based on the transporting position Y of the paper Q, which has been measured by the encoder-signal processing section 531. Concretely, the command generating section 536 inputs to the controller 533, the velocity command value Vr corresponding to the transporting position Y at that point of time, sequentially, according to a control sequence which is determined by control parameters K, Vb, Vp, and Dk which are set by the main control section 51. The control parameters K, Vb, Vp, and Dk are set in the command generating section 536 for a processing at step S120, which the main control section 51 executes.

Figure 24:
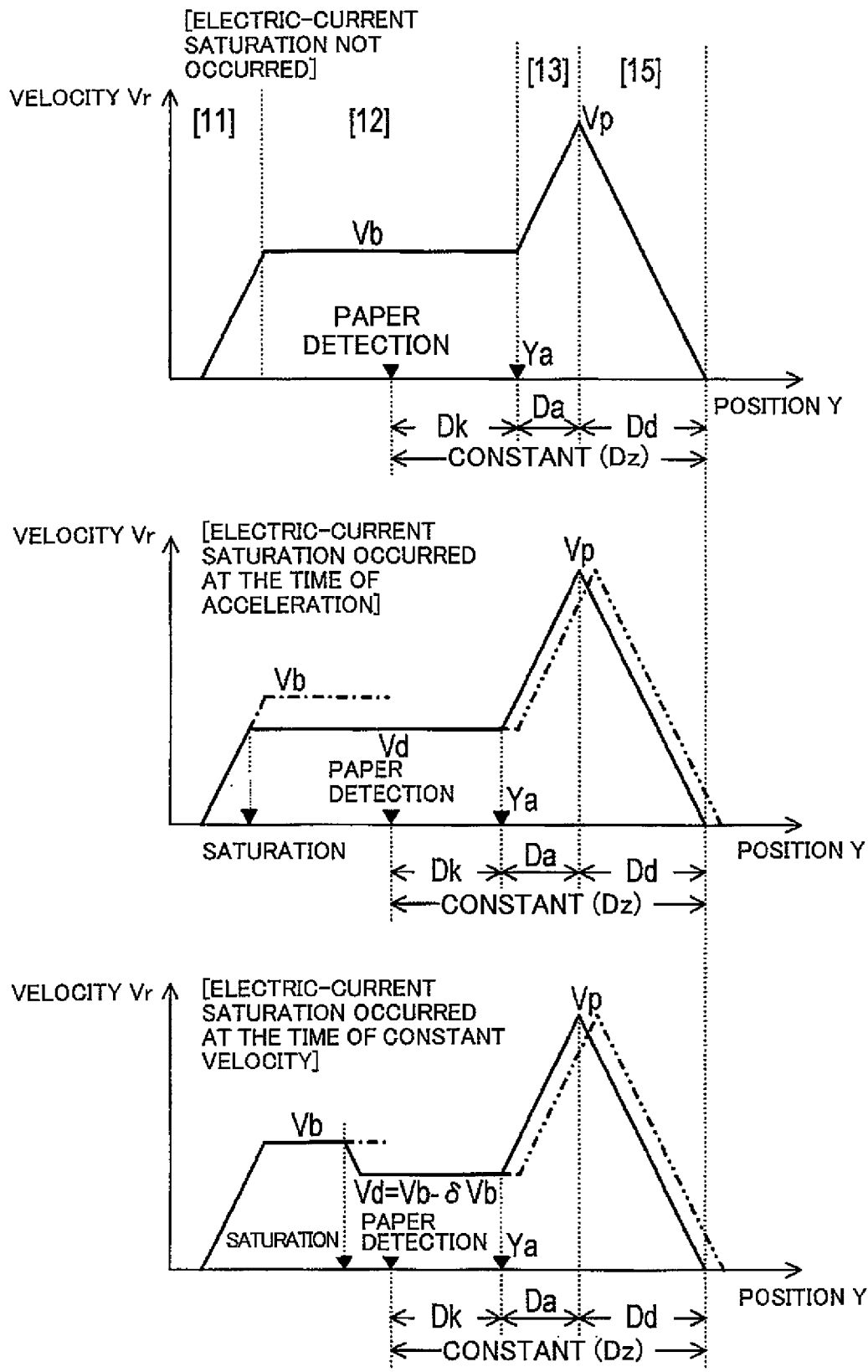
FIG. 24 is a graph showing a trajectory of the velocity command value in the second embodiment.

In an upper part of FIG. 24, a trajectory of the velocity command value Vr according to the control parameters K, Vb, Vp, and Dk which are set from the main control section 51 is indicated. As shown in the upper stage of FIG. 24, the control sequence according to the second embodiment includes an acceleration control phase [11] of controlling the LF motor M1 such that the paper Q is accelerated up to a velocity Vb, a constant-velocity control phase [12] of controlling the LF motor M1 such that the velocity V of the paper Q becomes a constant velocity Vb, after the end of the acceleration control phase [11], an acceleration control phase [13] of controlling the LF motor M1 such that the paper Q is accelerated up to the velocity Vp which is higher than the velocity Va, after the end of the constant-velocity control phase [12], and a deceleration control phase [15] of controlling the Lf motor M1 such that the paper Q is decelerated from the velocity Vp to velocity zero, after the end of the acceleration control phase [13]. A point of stopping the paper Q, which is a target for stopping the paper Q in the second embodiment is a point isolated by a distance Dz to a downstream (side) of a point at which, the paper detection sensor SN is switched to an ON signal.

The control parameter K determines a magnitude of acceleration at the time of accelerating the paper Q, and concretely, indicates a magnitude of inclination |dVr/dY| of the velocity command value Vr for the transporting position Y. Moreover, the control parameter Dk regulates a timing of shift to the acceleration control phase [13]. The command generating section 536 stops the constant-velocity control in the constant-velocity control phase [12] and starts the acceleration control at a point of time at which, a measured value Y becomes Ya=(Yk+Dk), based on a measured value Y=Yk at a point of time at which the output signal from the paper detection sensor SN has switched from the OFF signal to the ON signal. The control parameter Dk regulates a timing of shift to the acceleration control phase [13] by a transporting amount from a point of detection of paper Q by the paper detection sensor SN in such manner. In the following description, a starting point of the acceleration control which is regulated by the control parameter Dk is expressed as an acceleration starting point, and the position Ya=(Yk+Dk) corresponding to the acceleration starting point is also expressed as an acceleration starting position Ya.

Moreover, the control parameter δVb (refer to FIG. 23) is to be set along with the parameters K, Vb, Vp, and Dk, in the command generating section 536. The control parameter δVb indicates a correction amount of the velocity command value Vr when the electric-current saturation phenomenon has occurred in the constant-velocity control phase [12]. As shown in a lower part of FIG. 24, when the electric-current saturation phenomenon occurs in the constant-velocity control phase [12], the command generating section 536 corrects the velocity command value Vr to a value Vd=Vb−δVb, lowered by δVb. The lower stage in FIG. 24 indicates a trajectory of the velocity command value Vr in a case in which the electric-current saturation phenomenon has occurred in the constant-velocity control phase [12]. A middle part in FIG. 24 indicates a trajectory of the velocity command value Vr in a case in which the electric-current saturation phenomenon has occurred in the acceleration control phase [11].

Figure 25A:
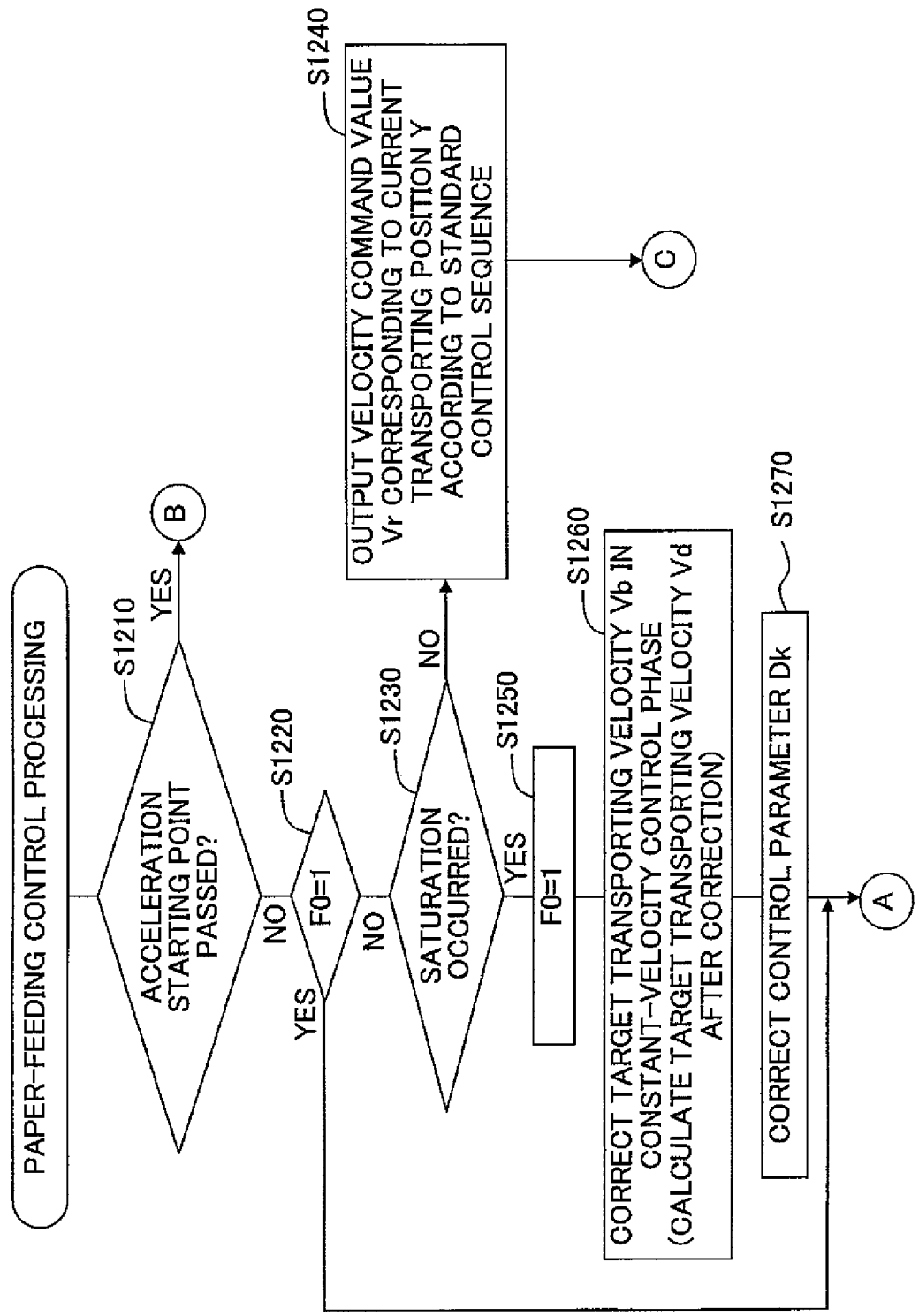
FIGS. 25A and 25B are a flowchart showing the paper-feed control processing by the command generating section.
Figure 25B:
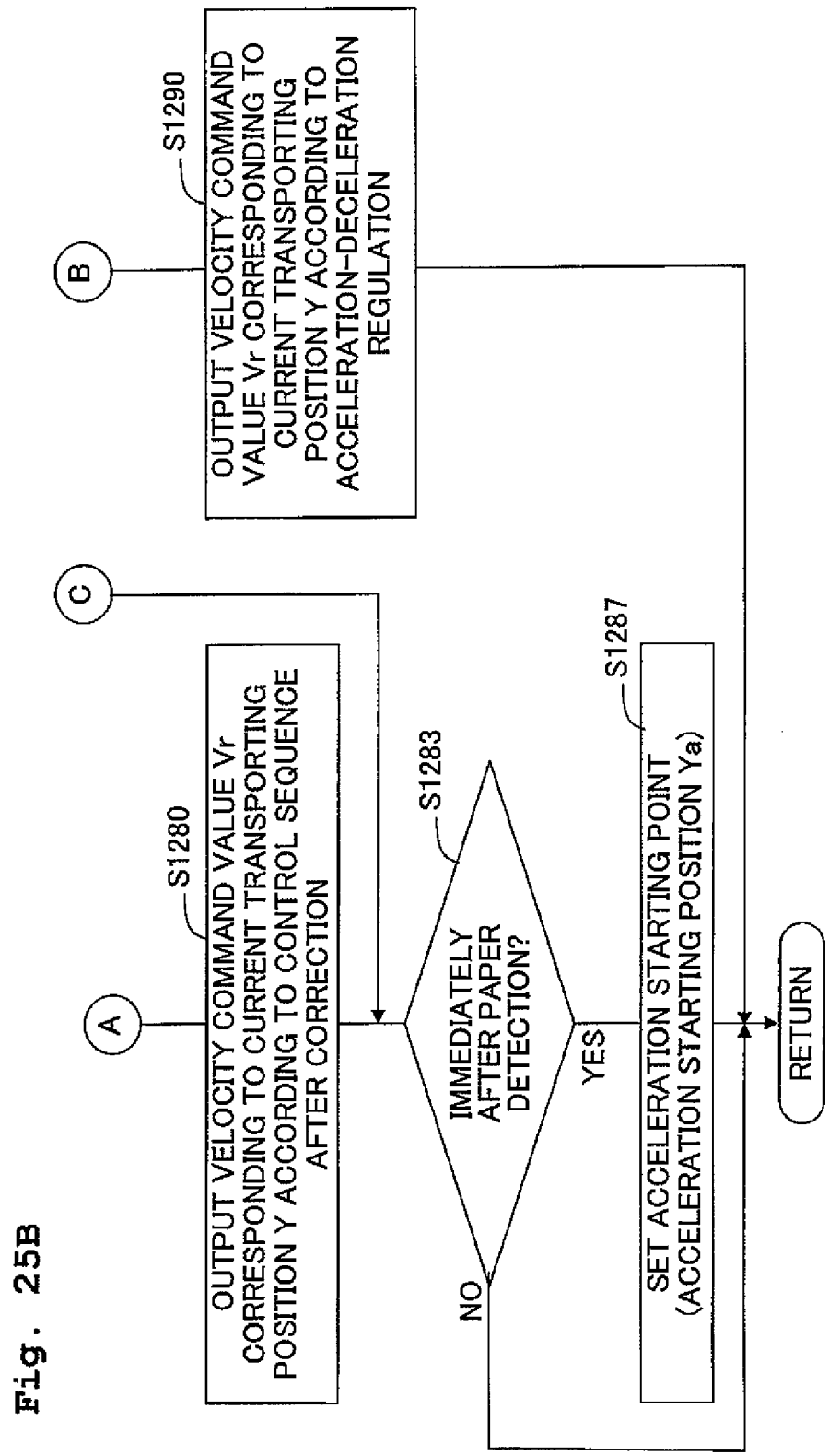

For executing the paper-feeding control by outputting the velocity command value Vr in such manner, as the control-start command is input from the main control section 51, the command generating section 536 executes the paper-feed control processing shown in FIGS. 25A and 25B repeatedly, according to the control cycle.

When the paper-feed control processing is started, the command generating section 536 makes a judgment of whether or not the paper Q has passed the acceleration starting point, based on the current transporting position Y of the paper Q which is obtained from the encoder-signal processing section 531 (S1210). The acceleration starting point is not set till the paper Q is detected by the paper detection sensor SN, and in a state of the acceleration starting point not being set, the command generating section 536 makes a judgment at step S1210 that the paper Q has not passed the acceleration starting point.

Moreover, as a judgment is made that the paper Q has not passed the acceleration starting point (No at S1210), the command generating section 536 makes a judgment of whether or not the value "1" has been set for the flag F0 (S1220). The flag F0 is reset to the value "0" at the time of inputting the control-start command, and is set to the value "1" at step S1250.

As the command generating section 536 makes a judgment that the value "1" has been set for the flag F0 (Yes at S1220), the process shifts to step S1280. At step S1280, the command generating section 536 makes a judgment that the value "1" has not been set for the flag F0 (No at S1220), and the process shifts to step S1230. As the process shifts to step S1230, the command generating section 536 makes a judgment of whether or not the electric-current saturation phenomenon has occurred in the LF motor M1, by making a judgment of whether or not a saturation-detection signal has been input from the saturation detection section 539. When the command generating section 536 makes a judgment that the electric-current saturation phenomenon has not occurred in the LF motor M1 (No at S1230), the process shifts to step S1240, and when the command generating section 536 makes a judgment that the electric-current saturation phenomenon has occurred in the LF motor M1 (Yes at S1230), the process shifts to step S1250.

As the process shifts to step S1240, the command generating section 536 outputs to the controller 533, the velocity command value Vr corresponding to the current transporting position Y as shown in the upper stage of FIG. 24, according to a standard control sequence which is determined by the abovementioned control parameters K and Vb which have been set from the main control section 51. Furthermore, the command generating section 536 makes a judgment of whether or not it is immediately after the switching of the output signal of the paper detection sensor SN from the OFF signal to the ON signal (S1283). As the command generating section 536 makes a judgment that the output signal of the paper detection sensor SN has not been switched from the OFF signal to the ON signal (No at S1283), the command generating section 536 terminates the paper-feed control processing without executing the processing at step S1287. Whereas, when the command generating section 536 makes a judgment that it is immediately after the switching of the output signal of the paper detection sensor SN from the OFF signal to the ON signal (Yes at S1283), the command generating section 536 terminates the paper-feed control processing after setting the acceleration starting point (S1287).

Concretely, at step S1287, the command generating section 536 sets the acceleration starting point by setting the acceleration starting position Ya to a value (Yk+Dk) which is obtained by adding the control parameter Dk to the transporting position (measured value) Y=Yk of the paper Q at the current point of time (S 1287). In such manner, as the acceleration starting point Ya=Yk+Dk is set, the command generating section 536 compares the current transporting position Y (measured value) of the paper Q which is obtained from the encoder-signal processing section 531, at step S1210 from the subsequent paper-feed control processing onward, and the acceleration starting position Ya which has been set at step S1287, and makes a judgment that the paper Q has passed the acceleration starting point at a point of time at which the current transporting position Y has crossed the acceleration starting position Ya which has been set at step S1287.

Whereas, as the process shifts to step S1250, the command generating section 536 sets the value "1" for the flag F0, and thereafter, corrects the control sequence after the occurrence of the electric-current saturation phenomenon, by correcting the target transporting velocity Vb in the constant-velocity control phase [12], which is defined by the control parameter Vb.

Concretely, at step S1260 in a case in which the electric-current saturation phenomenon has occurred in the acceleration control phase [11], the command generating section 536 corrects the target transporting velocity Vb in the constant-velocity control phase [12] to the velocity command value Vr immediately before. Whereas, at step S1260 in a case in which the electric-current saturation phenomenon has occurred in the constant-velocity control phase [12], the command generating section 536 corrects the target transporting velocity Vb in the constant-velocity control phase [12] to a value Vb−δVb which is obtained by subtracting δVb from Vb. In the following description, the target transporting velocity in the constant-velocity control phase [12] after the correction is denoted by Vd.

By such correction, in the constant-velocity control phase [12] after the occurrence of the electric-current saturation phenomenon, the paper Q is transported at the target transporting velocity Vd which is lower than a value at the beginning. Moreover, in the acceleration control phase [13], the paper Q is accelerated at an inclination which is defined by the control parameter K, till the velocity V of the paper Q, at a velocity Vp which is defined by the control parameter Vp from the target transporting velocity Vd after the correction. Therefore, an acceleration distance Da which is a paper transporting amount in the acceleration control phase [13] in the control sequence after the correction, changes from a distance Da=(Vp−Vb)/K before the control-sequence correction to a distance Da=(Vp−Vd)/K. Moreover, in such case, when a value of the control parameter Dk is not corrected in any way, a stopping position of the paper Q is shifted downstream in the transporting direction from a point which is let to be the target for stopping, only by an amount corresponding to an increase of (Vb−Vd)/K in the acceleration distance Da, as shown by an alternate long and two short dashes lines in the middle stage in FIG. 24 and the lower stage in FIG. 24.

Therefore, at step S1270 which is in continuity with step S1260, the control parameter Dk which regulates the timing of shift to the acceleration control phase [13] is corrected to a value obtained by subtracting (Vb−Vd)/K from the current value (S1270).

$$Dk \leftarrow Dk-(Vb-Vd)/K$$

In the second embodiment, the paper Q is stopped at a point which is let to be a target for stopping, upon expediting the timing of shift to the acceleration control phase [13] by a distance corresponding to an increase in the acceleration distance Da according to the correction of the control sequence in such manner.

Thereafter, the command generating section 536 outputs the velocity command value Vr corresponding to the current transporting position Y shown in the middle stage and the lower stage of FIG. 24, according to the control sequence after the correction (S1280). In other words, in a case in which the electric-current saturation phenomenon has occurred in the acceleration control phase [11], a constant value Vd is outputted continuously to the controller 533, as the velocity command value Vr immediately after the occurrence of the electric-current saturation phenomenon. Whereas, in a case in which the electric-current saturation phenomenon has occurred in the constant-velocity control phase [12], the velocity command value Vr is changed linearly from the value Vb up to the value Vd till the paper Q is transported by a distance δVb/K immediately after the occurrence of the electric-current saturation phenomenon, and the constant value Vd is outputted continuously to the controller 533, as the velocity command value Vr after the velocity command value Vr has reached the value Vd.

Moreover, as this process is terminated, the command generating section 536 makes a judgment at step S1283 mentioned above. In a case in which it is immediately after the output signal of the paper detection sensor SN has switched to the ON signal (Yes at S1283), the command generating section 536 terminates the paper-feed control processing after setting the acceleration starting point (S1287) by setting the acceleration starting position Ya=Yk+Dk by using the control parameter Dk after the correction.

Moreover, as the command generating section 536 makes a judgment that the paper Q has passed the acceleration starting point (Yes at S1210), the process shifts to step S1290, and the command generating section 536 outputs to the controller 533, the velocity command value Vr corresponding to the acceleration control phase [13] and the deceleration control phase [15], which is the velocity command value Vr corresponding to the current transporting position. In other words, the command generating section 536 outputs to the controller 533 the velocity command value Vr (S1290) which increases by inclination K from the value Vd or the value Vb at the time of start of the acceleration control phase [13] till reaching the value Vp, after the paper Q has reached the acceleration starting point, and which decreases by inclination K from the value Vp till reaching the value zero, thereafter.

In such manner, according to the second embodiment, it is possible to stop the paper Q at the target position with high accuracy while suppressing the occurrence of the electric-current saturation phenomenon in the LF motor M1.

The first embodiment and the second embodiment of the present invention have been described above. However, the present invention is not restricted to the first embodiment and the second embodiment, and it is possible to have various modifications. For instance, the present invention is also applicable to an image reading apparatus and various other electronic apparatuses which involve a transporting of a sheet.

Moreover, correspondence relationship in the terminology is as follows. The paper feeding mechanism 10 and the paper transporting mechanism, 20 in the first embodiment and the second embodiment are examples of a transporting mechanism which transports a sheet. The command generating sections 535, 536, and 555, and the saturation detection section 3 539 and 559 are examples of a control section. The paper feeding roller 103 is an example of a first transporting roller, the U-turn path 111 is an example of a sheet guiding section, and a transporting roller 201 is an example of a second transporting roller. Moreover, a transporting control of the paper Q which is realized by the paper-feed control processing, is an example of a transporting control by a first operation mode, and a transporting control of the paper Q which is realized by the paper-transport control processing, is an example of a transporting control by a second operation mode. Furthermore, the paper detection sensor SN is an example of a pass detection mechanism.

What is claimed is:

1. A transporting apparatus configured to transport a sheet, comprising:
    a motor;
    a transporting mechanism configured to receives a power from the motor and to transport the sheet; and
    a control section configured to:
        control the motor in accordance with a predetermined control sequence to make the transporting mechanism transport the sheet up to a target position; and
        detect an occurrence of an electric-current saturation phenomenon in the motor,
    wherein in a case that the control section detects the occurrence of the electric-current saturation phenomenon, the control section is configured to perform correction of the predetermined control sequence including a correction in which a target transporting velocity of the sheet is lowered from a predetermined value determined in the predetermined control sequence, and to control the motor in accordance with a corrected control sequence to make the transporting mechanism transport the sheet so that the sheet is stopped at the target position.

2. The transporting apparatus according to claim 1, wherein the predetermined control sequence includes a constant-velocity control phase which makes the transporting mechanism transport the sheet at a constant velocity corresponding to the target transporting velocity, and
    in a case that the control section detects the occurrence of the electric-current saturation phenomenon in the constant-velocity control phase, the control section is configured to lower the target transporting velocity in the correction of the predetermined control sequence, and to make the transporting mechanism transport the sheet at a constant velocity corresponding to the corrected target transporting velocity.

3. The transporting apparatus according to claim 2, wherein the constant-velocity control phase is provided as a plurality of constant-velocity control phases in the predetermined control sequence, and
    in a case that the control section detects the occurrence of the electric-current saturation phenomenon in one constant-velocity control phase of the plurality of constant-velocity control phases, the control section is configured to lower the target transporting velocity of the one constant-velocity control phase by an amount which has been determined in advance for the one constant-velocity control phase in the correction of the predetermined control sequence, and to make the transporting mechanism transport the sheet at a constant velocity corresponding to the corrected target transporting velocity.

4. The transporting apparatus according to claim 2, wherein the transporting mechanism includes:
    a first transporting roller configured to rotate by the power from the motor and apply a force in a transporting direction to the sheet;
    a sheet guiding portion arranged at a downstream side in the transporting direction of the first transporting roller and configured to transport the sheet while bending the sheet; and
    a second transporting roller provided at a downstream side in the transporting direction of the sheet guiding portion and configured to rotate by the power from the motor and apply a force in the transporting direction to the sheet,
    the transporting mechanism is configured to transport the sheet by applying a force to the sheet from any one of the first transporting roller and the second transporting roller according to a position of the sheet in the transporting direction,
    the control section has a first operation mode for making the transporting mechanism transport the sheet by rotating the first transporting roller by the power from the motor, and a second operation mode for making the transporting mechanism transport the sheet by rotating the second transporting roller by the power from the motor, and in a case that the control section detects the occurrence of the electric-current saturation phenomenon in the constant-velocity control phase in the first operation mode, the control section is configured to lower the target transporting velocity by an amount greater than an amount in a case that the control section detects the occurrence of the electric-current saturation phenomenon in the constant-velocity control phase in the second operation mode.

5. The transporting apparatus according to claim 1, wherein the predetermined control sequence includes an acceleration control phase in which transporting velocity of the sheet by the transporting mechanism is accelerated, and in a case that the control section detects the occurrence of the electric-current saturation phenomenon in the acceleration control phase, the control section is configured to: control the motor so that an acceleration of the sheet becomes zero at a velocity lower than a predetermined velocity determined in the predetermined control sequence to terminate the acceleration control phase; set the velocity at the time of terminating the acceleration control phase as the target transporting velocity; and shift to a constant-velocity control phase which makes the transporting mechanism transport the sheet at a constant velocity corresponding to the set target velocity.

6. The transporting apparatus according to claim 1, wherein the predetermined control sequence includes a first phase which makes the transporting mechanism transport the sheet at a constant velocity corresponding to the target transporting velocity, and a second phase in which the sheet is decelerated to velocity zero after the first phase and stopped at the target position, and in a case that the control section detects the occurrence of the electric-current saturation phenomenon, the control section is configured to: lower the target transporting velocity by the correction of the predetermined control sequence; shift to the first phase which makes the transporting mechanism transport the sheet at a constant velocity corresponding to the corrected target transporting velocity; correct a timing of shifting from the first phase to the second phase based on a transporting amount of the sheet in the second phase; and shift from the first phase to the second phase at the corrected timing.

7. The transporting apparatus according to claim 6, further comprising a pass detection mechanism configured to detect that the sheet has passed a point, on a sheet transporting path of the transporting mechanism, which is away from the target position by a predetermined distance toward an upstream side in a transporting direction of the sheet, wherein in a case that the pass detection mechanism detects that the sheet has passed, the control section is configured to correct the timing of shifting from the first phase to the second phase based on the transporting amount of the sheet in the second phase.

8. The transporting apparatus according to claim 1, wherein the predetermined control sequence includes:
a first acceleration control phase for controlling the motor to accelerate a transporting velocity of the sheet to a first target transporting velocity after transporting of the sheet is started;
a constant-velocity control phase for controlling the motor so that the transporting velocity of the sheet becomes a constant velocity corresponding to the first target transporting velocity after the end of the first acceleration control phase;
a second acceleration control phase for controlling the motor to accelerate the transporting velocity of the sheet to a second target transporting velocity after the end of the constant-velocity control phase; and
a deceleration phase for controlling the motor to decelerate the sheet from the velocity corresponding to the second target transporting velocity to velocity zero so that the sheet is stopped at the target position after the end of the second acceleration control phase, and in a case that the control section detects the occurrence of the electric-current saturation phenomenon in one of the first acceleration control phase and the constant-velocity control phase, the control section is configured to: lower the first target transporting velocity from a predetermined value determined in the predetermined control sequence in the correction of the predetermined control sequence; shift to the constant-velocity control phase which makes the transporting mechanism transport the sheet at a constant velocity corresponding to the corrected first target transporting velocity; and expedites a timing of shifting to the second acceleration control phase by time corresponding to the reduction of the first target transporting velocity.

9. The transporting apparatus according to claim 8, further comprising: a pass detection mechanism configured to detect that the sheet has passed a point, on a sheet transporting path of the transporting mechanism, which is away from the target position by a predetermined distance toward an upstream side in a transporting direction of the sheet, wherein the timing of shift to the second acceleration control phase is defined by a transporting amount of the sheet from a point of time at which the pass detection mechanism detects a passing of the sheet, and the control section expedites the timing of shift to the second acceleration control phase by shortening the transporting amount of the sheet for defining the timing of shift.

* * * * *